United States Patent
Ichiki et al.

(10) Patent No.: US 7,761,934 B2
(45) Date of Patent: Jul. 27, 2010

(54) DRAIN SOCKET AND FLUSH TOILET

(75) Inventors: Tomoyasu Ichiki, Kitakyushu (JP);
Tsuyoshi Ozeki, Kitakyushu (JP);
Toshifumi Yoneda, Kitakyushu (JP);
Osamu Kobayashi, Kitakyushu (JP);
Katsuhiro Kawakami, Kitakyushu (JP);
Mitsuyoshi Machida, Kitakyushu (JP);
Shinji Shibata, Kitakyushu (JP);
Hiroshi Tomonari, Kitakyushu (JP)

(73) Assignee: Toto Ltd. (JP)

( * ) Notice: Subject to any disclaimer, the term of this patent is extended or adjusted under 35 U.S.C. 154(b) by 928 days.

(21) Appl. No.: 10/535,689

(22) PCT Filed: Nov. 25, 2003

(86) PCT No.: PCT/JP03/14996

§ 371 (c)(1),
(2), (4) Date: May 18, 2005

(87) PCT Pub. No.: WO2004/048708

PCT Pub. Date: Jun. 10, 2004

(65) Prior Publication Data

US 2006/0123533 A1    Jun. 15, 2006

(30) Foreign Application Priority Data

Nov. 22, 2002   (JP)   ............................. 2002-338972
Dec. 24, 2002   (JP)   ............................. 2002-371546
Oct. 6, 2003    (JP)   ............................. 2003-347184

(51) Int. Cl.
*E03D 11/00*   (2006.01)

(52) U.S. Cl. ......................................................... 4/420
(58) Field of Classification Search ...................... 4/420, 4/421, 679
See application file for complete search history.

(56) References Cited

U.S. PATENT DOCUMENTS

2006/0005310 A1*   1/2006   Nakamura et al. .............. 4/420

FOREIGN PATENT DOCUMENTS

| JP | 6-71578 | 10/1994 |
| JP | 08260551 | 10/1996 |

(Continued)

OTHER PUBLICATIONS

Japanese Office Action dated Nov. 7, 2005 for Japanese Patent Application No. 2005-510287 and English translation of the Japanese Office Action.

*Primary Examiner*—Tuan N Nguyen
(74) *Attorney, Agent, or Firm*—Brooks Kushman P.C.

(57) ABSTRACT

A flush toilet and a drain socket are provided that align the direction of waste passing through a drainage trap so as to prevent pipe clogging without impairing wastewater discharge performance by a siphon effect. The drain socket is for connecting an outlet of a trap drainage channel of a flush toilet unit and a drain pipe located external of the flush toilet unit. The drain socket includes a drain socket body provided with an inlet for coupling with the trap drainage channel and an outlet for coupling with the drain pipe, a siphon inducing region provided on an inner wall of the drain socket body for inducing a siphon effect, and a straightening vane provided upstream of the siphon inducing region of the drain socket body to extend from the inner wall in the inward direction of the channel.

36 Claims, 16 Drawing Sheets

FOREIGN PATENT DOCUMENTS

| | | |
|---|---|---|
| JP | 08326136 | 12/1996 |
| JP | 11269951 A * | 10/1999 |
| JP | 2001220805 | 8/2001 |
| JP | 2001-279796 A1 | 10/2001 |

* cited by examiner (a)

A-A SECTION (b)

(a)

A-A SECTION (b)

(a)

A-A SECTION (b)

(a)

A-A SECTION (b)

(a)

(b)

(a) 
A-A SECTION (b)

(c) 
B-B SECTION

DRAIN SOCKET AND FLUSH TOILET

TECHNICAL FIELD

This invention relates to an improved drain socket installed and connected between the trap drainage channel of a flush toilet or a terminal outlet of the trap drainage channel of a flush toilet and a drain pipe external of the toilet.

BACKGROUND ART

The siphon effect has long been used to improve the waste discharge performance of flush toilets. Flush toilets of this type have an orifice formed in the outlet for inducing the siphon effect and a drain socket provided with a contraction that is used on the upstream side of the orifice (see, for example, JP-Hei 8-260551, pages 2-4 and FIG. 1). This drain socket produces a siphon effect at an early stage by producing a turbulent state of the flushing water at two stages, i.e., at the contracted portion on the upstream side and at the orifice of the outlet, thereby forming water curtains.

This drain socket forms water curtains by producing a turbulent state of the flushing water at two stages, i.e., at the contracted portion on the upstream side and at the orifice of the outlet, and further reduces the channel volume to produce a siphon effect at an early stage. As methods for enhancing floating waste suction and discharge efficiency at the final stage of siphoning, it has been proposed to increase the amount of channel flushing water by providing the inside of the channel of the drain socket with irregularities directed parallel to the floor or providing a reservoir chamber separately of the channel (see, for example, JP 2001-279796, pages 8-9 and FIG. 2-5).

Further, in the case where the position of the terminal outlet of the trap drainage channel of a flush toilet unit and the position of a drain pipe external of the toilet are not in alignment, it has been proposed to use a drain socket whose inlet and outlet are eccentrically positioned. This drain socket comprises a bent pipe member and a horizontal weir section provided at the outlet end thereof, and this horizontal weir section induces a siphon effect (see, for example, JP-Hei 8-326136, page 2 and FIGS. 2, 4).

DISCLOSURE OF THE INVENTION

Problems to be Solved by the Invention

In the case of the aforesaid drain sockets, however, the step or orifice parallel to the floor that forms the upper portion of the contraction becomes an obstacle with which waste collides to clog the channel and make passage of other waste difficult. Further, since the upper surface of the step or orifice is horizontal, waste is liable to remain and accumulate on the step after drainage and cause pipe clogging.

Although the drain socket taught by JP-Hei 8-260551 is effective for achieving early siphoning and a large siphon force owing to the formation of a water curtain at two stages, i.e., at the contraction section on the upstream side and at the outlet orifice, it is insufficient in the point of sustaining siphoning and is weak in floating waste suction and discharge at the final stage of siphoning. In addition, the contraction section and orifice become obstacles that make passage of large pieces of waste particularly difficult. On the other hand, in the case of the drain socket formed with irregularities directed parallel to the floor of the aforesaid JP 2001-279796, the irregularity section becomes an obstacle because its inside diameter is smaller than that of the outlet and the number of irregularities is large, so that passage of large pieces of waste may become particularly difficult. Moreover, in the case of the drain socket of JP 2001-279796 that is provided with a reservoir chamber separately of the channel, the drain socket becomes complex in overall and is by no means good in productivity.

Although the drain socket of JP-Hei 8-326136 can deal with situations in which the outlet of the flush toilet unit and the drain pipe are not in alignment and can induce a siphon effect, this drain socket experiences sticking of waste to the horizontal weir section and sometimes cannot pass large pieces of waste smoothly.

An object of the present invention is therefore to provide a flush toilet and a drain socket that align the direction of waste passing through a drainage trap so as to prevent pipe clogging without impairing wastewater discharge performance by a siphon effect.

Another object of the present invention is to provide a drain socket of simple structure that can simultaneously achieve improved floating waste suction and discharge performance by prolonging siphoning duration and improved large waste discharge performance by reduction of contact resistance between waste and the internal wall.

Another object of the present invention is to provide a drain socket that can be utilized when a flush toilet unit and a drain pipe are not in alignment and that enables smooth passage of large pieces of waste so as to reduce the likelihood of waste adhering to interior portions.

Means of Solving Problems

In order to achieve the foregoing objects, the present invention provides a drain socket for connecting an outlet of a trap drainage channel of a flush toilet unit and a drain pipe located external of the flush toilet unit, which drain socket comprises a drain socket body provided with an inlet for coupling with the trap drainage channel and an outlet for coupling with the drain pipe, a siphon inducing region provided on an inner wall of the drain socket body for inducing a siphon effect, and a straightening vane provided upstream of the siphon inducing region of the drain socket body to extend from the inner wall in the inward direction of the channel.

The siphon inducing region can be a contraction step provided near an outlet portion of the outlet of the drain socket body or a channel contraction section provided in the drain socket body.

In the drain socket of the present invention structured in the foregoing manner, one or more straightening vanes provided to extend from the inner wall in the inward direction of the channel enable slender waste passing down through the trap drainage channel of the flush toilet unit together with flushing water to collide with the straightening vanes to be aligned in the direction of flushing water flow and discharged into the drain pipe.

The general practice for inducing siphoning in a siphon-type flush toilet is to provide a contraction section or step or to form an orifice inside a drain socket. The contraction section/step or orifice helps to induce siphoning but becomes an obstacle to the passage of slender waste, wadded toilet paper and the like. The provision of the straightening vanes just upstream of the channel section which might become such an obstacle ensures that the direction of horizontally oriented slender pieces of waste are aligned in the direction of water flow and that any toilet paper wadded into a large ball is shredded, so that the contraction section or orifice is no longer an obstacle to waste passage. The site of straightening vane installation is therefore preferably just upstream of the contraction section, orifice or other region for inducing so-called siphoning and maximum effect can be achieved in such case.

Further, toilet paper wadded into a large ball that passes downward through the trap drainage channel of the flush toilet unit together with the flushing water collides with the straightening vane(s) to be finely shredded, thereby ensuring that the contraction section or the like provided inside the drain socket for inducing siphoning does not become an obstacle that causes clogging and enabling rapid discharge into the drain pipe. On the other hand, the provision of the straightening vanes enables the channel volume of the trap drainage channel or the interior of the drain socket to be made somewhat smaller than when no straightening vanes are provided and, therefore, makes it possible to quickly establish a water-filled state so as to realize a flush toilet whose period required for generation of a siphon effect is further shortened.

The present invention provides a drain socket further comprising a channel expansion section that is provided on the upstream side of the channel contraction section and having the straightening vanes provided in the channel expansion section.

The present invention also provides a drain socket wherein the straightening vanes are provided on the inner wall of the channel expansion section and channel contraction section to extend in the inward direction of the channel.

The drain socket of the present invention structured in the foregoing manner has channel contraction sections at the channel expansion section toward the inlet of the drain socket and has a channel contraction section toward the outlet thereof and at least one straightening vane is provided on the inner wall of the channel expansion section of the drain socket, whereby flushing water flowing down through the trap drainage channel of the flush toilet unit collides with the expansion section and contraction section inner walls and the straightening vanes to give rise to temporary retention of flushing water, thereby producing a water-filled state and generating a siphon effect. In this case, a siphon effect can advantageously be generated at an earlier stage than when the drain socket has no channel expansion section, channel contraction section or straightening vanes. In addition, slender waste passing down through the trap drainage channel of the flush toilet unit together with flushing water collides with the straightening vane(s) to be aligned in the direction of flushing water flow and discharged into the drain pipe without clogging the channel. Further, toilet paper wadded into a large ball that passes downward through the trap drainage channel of the flush toilet unit together with the flushing water collides with the straightening vanes to be finely shredded and discharged into the drain pipe without clogging the channel. Moreover, the channel contraction section communicates the inside diameter of the expansion section on the side of the outlet of the drain socket with the inside diameter of the drain pipe via a continuous slope, so that it advantageously eliminates the sticking and accumulation of waste at a horizontal step region seen at the orifice section or contraction section in the prior art.

In the present invention, the number of straightening vanes provided is preferably between 2 and 16.

In the present invention, the length of the straightening vane from the inner wall in the inward direction of the channel is preferably not less than 1 mm and not greater than $(D1-D2)/2$ mm, where $D1$ is the inside diameter of the channel inner wall at the section where the straightening vanes are provided and $D2$ is the inside diameter of the outlet of the drain socket.

In the present invention, the thickness of the straightening vanes is preferably not less than 2 mm and not greater than 40 mm In the present invention, the spacing between the tips of the straightening vanes in the inward direction of the channel is preferably not less than 10 mm and not greater than 100 mm.

In the present invention, a region of the drain socket body at the boundary between the channel expansion section and channel contraction section is preferably constituted as a divisible structure.

In the present invention, the drain socket body is preferably structured to establish the relationship $L>D$, where $L$ is the length of the region between the channel contraction section and the outlet and $D$ is the inside diameter thereof.

In the present invention, the drain socket body preferably comprises a toilet socket module provided at the inlet thereof for accommodating the outlet of the trap drainage channel and a drain pipe socket module provided at the outlet thereof for insertion in the drain pipe. In addition, the drain socket has a lateral pipe section extending laterally a predetermined distance between the channel contraction section and outlet. Interconnection of the toilet socket module and drain pipe socket module through the lateral pipe section advantageously makes it possible in the case of replacing an existing flush toilet unit with a new one to install the new toilet without need for work involving the floor drain pipe even if the location of the floor drain pipe should be out of alignment with the outlet of the trap drainage channel of the new flush toilet unit.

In order to achieve the foregoing objects, the present invention provides a flush toilet, which comprises a drain socket according to the present invention described in the foregoing and a flush toilet in an integrated structure.

The general practice for inducing siphoning in a siphon-type flush toilet is to provide a contraction section or step or to form and orifice near the outlet of the trap drainage channel. The contraction section/step or orifice helps to induce siphoning but becomes an obstacle to the passage of slender waste, wadded toilet paper and the like. Provision of straightening vanes just upstream of the channel section which might become such an obstacle ensures that the direction of horizontally oriented slender pieces of waste are aligned in the direction of water flow and that any toilet paper wadded into a large ball is shredded, so that the contraction section or orifice is no longer an obstacle to waste passage. The site of straightening vane installation is therefore preferably just upstream of the contraction section, orifice or other region for inducing so-called siphoning and maximum effect can be achieved in such case.

Further, toilet paper wadded into a large ball that passes downward through the trap drainage channel of the flush toilet unit together with the flushing water collides with the straightening vanes to be finely shredded, thereby ensuring that the contraction section or the like provided near the outlet of the trap drainage channel for inducing siphoning does not become an obstacle that causes clogging and enabling rapid discharge into the drain pipe. On the other hand, the provision of the straightening vanes enables the channel volume of the trap drainage channel or the interior of the drain socket to be made somewhat smaller than when no straightening vanes are provided and, therefore, makes it possible to quickly establish a water-filled state so as to realize a flush toilet whose period required for generation of a siphon effect is further shortened.

In order to achieve the foregoing objects, the present invention provides a drain socket for connecting an outlet of a trap drainage channel of a flush toilet unit and a drain pipe located external of the flush toilet unit, which drain socket comprises a drain socket body provided with an inlet for coupling with the trap drainage channel and an outlet for coupling with the drain pipe, a channel contraction section provided in the channel of the drain socket body, and a guide groove provided on the downstream side of the channel contraction section continuously in the water flow direction, the entire channel in the drain socket body having an inside diameter equal to or larger than the inside diameter of outlet of the trap drainage channel.

At the early stage of flushing in the drain socket of the present invention structured in the foregoing manner, the flushing water flowing out from the inlet collides with the channel contraction section in the channel and most of the flushing water splashes in the inward direction of the channel to form a water curtain and induce siphoning. Since the amount of flushing water from the early to intermediate stage of flushing is great, the siphon effect induced at the channel contraction section is sustained and the flushing water is discharged from the outlet of the drain socket without passing through the guide groove. At the final stage of flushing, the amount of flushing water passing downward through the channel of the drain socket decreases, making it impossible to induce siphoning in the channel contraction section. The reduced amount of flushing water passes downward along the inner wall of the channel at this time and, owing to the provision of the guide groove on the downstream side of the channel contraction section 11, enters and flows downward through the groove. The flushing water in the groove collides with the step provided at the end of the groove to splash in the inward direction of the channel, thereby inducing siphoning near the end of the guide groove. The prolongation of the siphoning duration from the early to intermediate stage of flushing in this manner is advantageous because it works particularly to improve floating waste discharge performance.

In addition, when a large piece of waste such as toilet paper wadded into a large ball passes through the channel provided with the guide groove, the large piece of waste does not does not contact the interior of the guide groove, so that the contact surface area between the waste and inner wall is reduced to lower frictional resistance, thereby making it possible to prevent waste clogging owing to excessive frictional resistance. In the drain socket of the present invention, the entire channel of the drain socket body has an inside diameter equal to or larger than the inside diameter of the outlet of the trap drainage channel. As this means that there is no portion present in the channel with an inside diameter smaller the outlet, not even the channel contraction section acts as a factor preventing passage of waste, so that very smooth large waste discharge can be realized thanks to the contributing effect of reduced frictional resistance between waste and the inner wall produced by the guide grooves.

The present invention provides a drain socket further comprising a channel expansion section on the upstream side of the channel contraction section.

At the early stage of flushing in the drain socket of the present invention structured in the foregoing manner, the flushing water flowing down from the inlet collides with the channel contraction section in the channel and most of the flushing water splashes in the inward direction of the channel to form a water curtain and induce siphoning. Since the amount of flushing water from the early to intermediate stage of flushing is great, the siphon effect induced at the channel contraction section is sustained and the flushing water is discharged from the outlet of the drain socket without passing through the guide groove. From the intermediate to final stage of flushing, the amount of flushing water passing downward through the drain socket progressively decreases, but owing to the presence of the channel expansion section on the upstream side of the channel contraction section, the decrease in the amount of flushing water is accompanied by flow thereof downward along the inner wall of the channel expansion section, thereby producing a delaying effect. As a result, it is possible despite the slight decrease in the amount of water to maintain siphoning at the channel contraction section more readily than when the channel-expansion section is absent. At the final stage of flushing, the amount of flushing water passing downward through the channel of the drain socket decreases still further, making it impossible to induce siphoning in the channel contraction section. At this time, almost all of the reduced amount of flushing water passes downward along the inner wall of the channel and, owing to the provision of one or more guide grooves on the downstream side of the channel contraction section, enters and flows downward through the grooves. The flushing water in the grooves collides with the steps provided at the ends of the grooves to splash in the inward direction of the channel, thereby inducing siphoning near the ends of the guide grooves. The prolongation of the siphoning duration from the intermediate to final stage of flushing in this manner is advantageous because it works particularly to improve floating waste discharge performance.

In addition, when a large piece of waste such as toilet paper wadded into a large ball passes through the channel provided with the guide grooves, the large piece of waste does not does not contact the interior of the guide grooves, so that the contact surface area between the waste and inner wall is reduced to lower frictional resistance, thereby making it possible to prevent waste clogging owing to excessive frictional resistance. In the drain socket of the present invention, since there is no portion present in the channel with an inside diameter smaller the outlet, not even the channel contraction section acts a factor preventing passage of waste, so that very smooth large waste discharge can be realized thanks to the contributing effect of reduced frictional resistance between waste and the inner wall produced by the guide grooves.

In the present invention, the guide grooves are preferably formed by cutting away a part of the channel contraction section. Since this configuration enables the small amount of flushing water at the final stage of flushing to be reliably introduced into the guide grooves, the duration of siphoning from the intermediate to final stage of flushing can be prolonged in accordance with the effect of the flushing water flowing down the aforesaid guide grooves.

In a preferred embodiment of the present invention, the drain socket further comprises a straightening vane provided at the channel contraction section and the inner wall upstream thereof to extend in inward direction of the channel.

In the drain socket which has the channel contraction section in the channel thereof and has one or more guide grooves provided downstream of the channel contraction section continuously in the direction of water flow, and wherein the entire channel therein has an inside diameter equal to or greater than the inside diameter of the outlet of the trap drainage channel, the provision of one or more straightening vanes at the channel contraction section and the inner wall upstream thereof to extend in inward direction of the channel is advantageous because it enables slender waste passing down together with flushing water to collide with the straightening vanes to be aligned in the direction of flushing water flow and toilet paper wadded into a large ball to collide with the straightening vanes to be finely shredded, whereby obstruction of waste movement by the channel contraction section is eliminated to enable very smooth discharge of waste.

Preferably in the drain socket of the present invention, the channel thereof comprises a channel contraction section and a channel expansion section upstream of the channel contraction section, is provided downstream of the channel contraction section with one or more guide grooves continuously in the direction of water flow, and has an inside diameter throughout that is equal to or greater than the inside diameter of the outlet of the trap drainage channel, which drain socket comprises a straightening vane provided on the inner wall of the channel expansion section and channel contraction section to extend in the inward direction of the channel.

The provision of one or more straightening vanes on the inner wall of the channel expansion section and channel contraction section to extend in the inward direction of the channel is advantageous because it enables slender waste passing down together with flushing water to collide with the straightening vanes to be aligned in the direction of flushing water flow and toilet paper wadded into a large ball to collide with the straightening vanes to be finely shredded, whereby obstruction of waste movement by the channel contraction section is eliminated to enable very smooth discharge of waste.

In the present invention, the number of guide grooves is preferably in the range of from 2 to 16.

In the present invention, the depth of the guide groove is preferably not less than 1 mm and not greater than 15 mm.

In the present invention, the width of the guide groove is preferably not less than 2 mm and not greater than 30 mm.

In the present invention, guide grooves are preferably provided at a spacing of the tips in the inward direction of the channel of not less than 5 mm and not greater than 100 mm.

In the present invention, a region of the drain socket body at the boundary between the channel contraction section and guide groove is preferably constituted as a divisible structure.

In the present invention, the drain socket body is preferably structured to establish the relationship L>D, where L is the length of the region between the channel contraction section and outlet provided with the guide groove and D is the inside diameter thereof.

In order to achieve the foregoing objects, the present invention provides a drain socket to be arranged to connect a terminal outlet of a trap drainage channel of a flush toilet unit and a drain pipe located external of the flush toilet unit whose center is eccentrically located with respect to the center of the outlet, which drain socket comprises a drain socket body provided with an inlet for coupling with the terminal outlet of the trap drainage channel, a channel expansion section in which the inside diameter of the channel expands toward the downstream side from the inlet, a deflector plate extending in the inward direction from the inner wall of the channel expansion section, a siphon inducing shelf formed at the downstream end of the channel expansion section to extend at least on the side in the direction opposite from the direction of eccentricity, and a bent pipe that extends from the downstream end of the channel expansion section and whose downstream end couples with the drain pipe.

In the drain socket of the present invention structured in the foregoing manner, the provision of the deflector plates on the inner wall of the channel expansion section enables large waste to pass smoothly even when the terminal outlet of the trap drainage channel of the flush toilet unit is eccentric with respect to the drain pipe.

Flushing water exiting the terminal outlet of the trap drainage channel of the flush toilet unit flows into the invention drain socket through the inlet thereof, whereafter it passes into the channel expansion section. The flushing water falls onto the siphon inducing shelf and flies upward to form a water curtain in the vicinity of the channel expansion section, thereby producing a siphon effect. The waste and flushing water in the bowl of the flush toilet unit are sucked by the siphon effect to be drawn into the drain socket. The waste entering the channel expansion section of the drain socket is guided along the edge of the deflector plates provided on the inner wall of the channel expansion section to be smoothly led into the bent pipe communicating with the channel expansion section and discharged into the drain pipe. On the other hand, the flushing water flowing into the drain socket together with waste passes throughout the channel expansion section, including the portions between the deflector plates to fill the channel expansion section and sustain the siphon effect for a predetermined period.

In the present invention, the deflector plates are preferably formed only on the inner wall of the channel expansion section on the side in the direction opposite from the direction of eccentricity.

In the drain socket of the present invention structured in the foregoing manner, waste passing into the channel expansion section is guided in the direction of eccentricity by the deflector plates formed on the inner wall of the channel expansion section on the side in the direction opposite from the direction of eccentricity, and since no deflector plates are formed on the inner wall on the side in the direction of eccentricity, the channel cross-sectional area through which waste can pass can be made large.

In the present invention, deflector plates are preferably formed to be spaced apart from the siphon inducing shelf.

In the drain socket of the present invention structured in the foregoing manner, the flushing water flowing into the drain socket and falling onto the siphon inducing shelf flies up not only in the radial direction but also circumferentially by passing through the space between the deflector plates and the siphon inducing shelf and, therefore, a siphon effect can be rapidly produced after the flushing water starts to flow into the drain socket.

In the present invention the drain socket preferably comprises deflector plates of generally triangular shape, wherein a first side of the triangular shape is joined to the inner wall of the channel expansion section, a second side is directed substantially horizontally, a third side is directed so that an extension thereof lies substantially tangent to the inner wall of the bent pipe on the side in the direction opposite from the direction of eccentricity, and an apex between the second side and the third side is rounded.

In the drain socket of the present invention structured in the foregoing manner, waste passing into the drain socket is guided by the third sides of the deflector plates to slide downward and fall into the bent pipe, whereafter it moves along the inner wall of the bent pipe, thus enabling waste to be smoothly passed. Since the apex between the second side and third side is rounded at a predetermined radius of curvature, catching of waste on the deflector plates and impediment of waste flow can be prevented.

In the present invention, the gap between the deflector plates and the siphon inducing shelf is preferably between 5 and 15 mm.

In the present invention, the siphon inducing shelf is preferably formed to be widest at the middle and to narrow progressively in the direction of eccentricity.

In the drain socket of the present invention structured in the foregoing manner, since the siphon inducing shelf is formed to be widest at the portion present above the deflector plates and to narrow progressively with increasing proximity to portions where no deflector plates are present, an effective siphon effect can be induced while preventing sticking of waste to the siphon inducing shelf.

In the present invention, the deflector plates preferably extend farther inward than the siphon inducing shelf.

In the drain socket of the present invention structured in the foregoing manner, waste that slides and falls under guidance by the deflector plates follows a descending trajectory passing over the siphon inducing shelf, whereby sticking of waste to the siphon inducing shelf can be prevented.

In the present invention, the end portion of the bent pipe on the downstream side is preferably constituted as a straight pipe.

In the drain socket of the present invention structured in the foregoing manner, since the end portion on the outlet side of the bent pipe that is inserted into the drain pipe external of the toilet is constituted as a straight pipe, the insertion of the bent pipe into the drain pipe can be achieved without interference with the drain pipe even when the drain pipe projects from the floor.

In the present invention, the drain socket preferably further comprises a coupling flange for supporting the bent pipe on the floor on which the flush toilet unit is to be installed, the end of the bent pipe on the downstream side being above the floor when the coupling flange is set on the floor.

In the drain socket of the present invention structured in the foregoing manner, since the end of the bent pipe on the outlet side does not project below the lower end surface of the coupling flange, the drain socket can be set upright on the floor, thereby preventing damage to the end of the bent pipe.

Embodiments of the present invention will be explained on based on drawings below.

BEST MODES OF CARRYING OUT THE INVENTION

Figure 1:
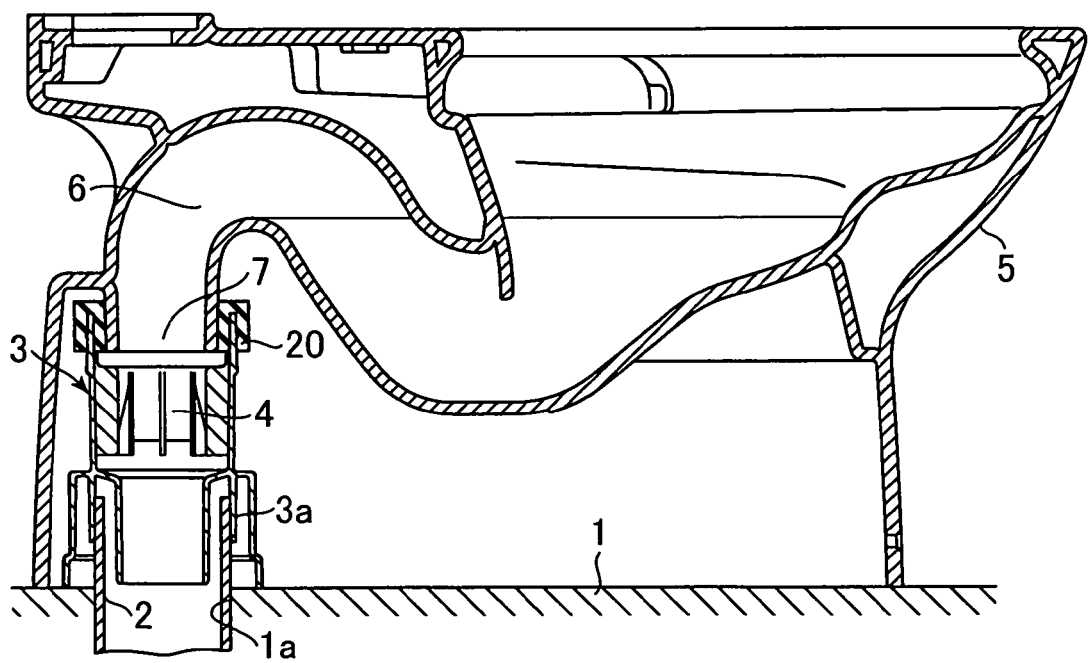
FIG. 1 is a vertical sectional view showing a drain socket and a coupling structure between a flush toilet unit and drain pipe according to a first embodiment of the present invention.
Figure 2:
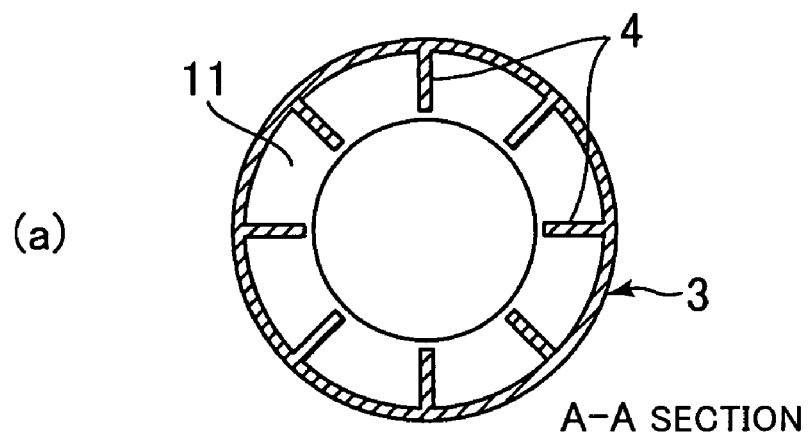
FIG. 2 is a set of diagrams showing the drain socket of the first embodiment of the present invention, wherein (a) is a cross-sectional view and (b) is a vertical sectional view.
Figure 2:
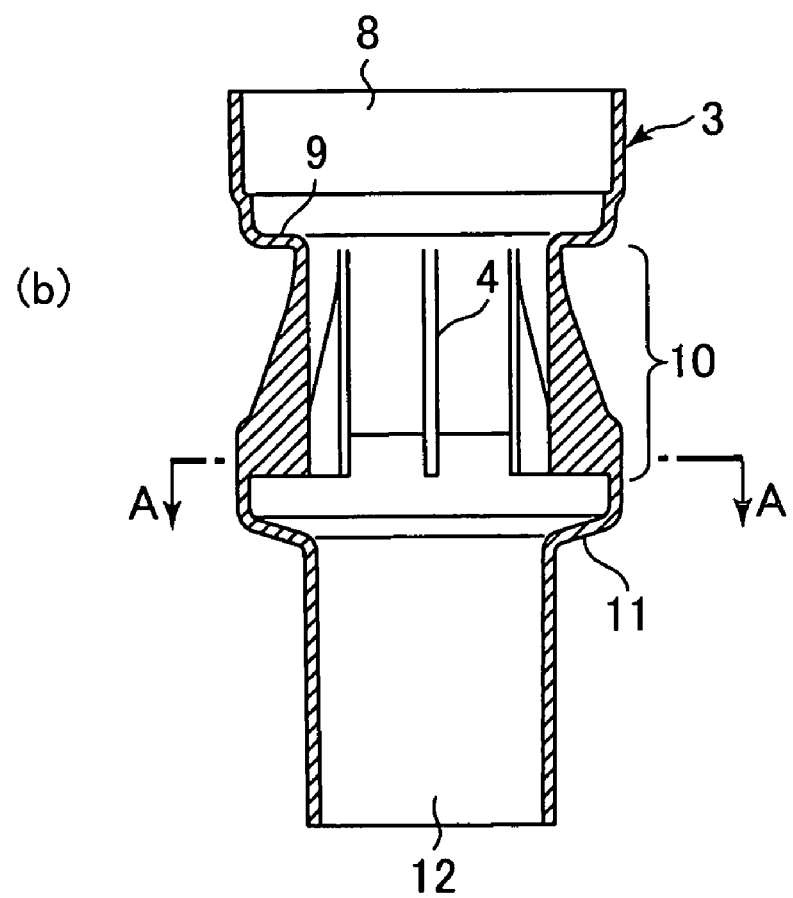

FIG. 1 is a vertical sectional view showing a drain socket and a coupling structure between a flush toilet unit and drain pipe according to a first embodiment of the present invention. FIG. 2 is a set of enlarged views of a main body showing the drain socket section of FIG. 1 with the coupling structure portion cut away.

In FIG. 1, a drain pipe 2 is shown to rise through a hole 1*a* formed in a floor 1. A drain socket body 3 water-tightly fastened to the outlet 7 of the trap drainage channel 6 of a flush toilet unit 5 installed on the floor 1 is water-tightly fastened to the drain pipe 2. The drain socket body 3 and the drain pipe 2 are joined by a coupling 3*a* The coupling 3*a* has a region having multiple inside/outside diameters for enabling adaptation to differences in the outside diameter of the drain pipe 2. The drain socket body 3 is water-tightly fastened to the trap drainage channel 6 by a packing 20. Since the drainage trap is subject to manufacturing error and some amount of diameter variation, the inside diameter of the inlet of the drain socket body 3 is made large and the error is adsorbed by the packing 20.

The drain socket and drain pipe are coupled and used with the outer peripheral surface of the drain socket and the inner peripheral surface of the drain pipe fitted together. Ordinarily, the drain pipe is installed to rise a certain length from the floor. The region near the outlet of the drain socket is coupled in an embedded manner, so that in the case of a drain socket having a channel expansion section and channel contraction section, the end of the channel contraction section might abut on the outer wall surface to hinder the coupling. It is therefore preferable to prevent interference between the drain pipe and channel contraction section by establishing L>D, where L is the length of the region between the channel contraction section and the outlet of the drain socket and D is the inside diameter thereof.

As shown at (a) and (b) of FIG. 2, the inside of the channel of the drain socket body 3 is formed with a channel expansion section 10 in which the inside diameter of the channel progressively increases from the inlet 8 toward the outlet 12 and an ensuing channel contraction section 11 in which the inside diameter of the channel progressively decreases in the direction of water flow. Multiple straightening vanes 4 are provided in the channel of the channel expansion section 10 to extend into the channel from the wall thereof. Owing to the fact that the inlet 8 constituting the coupling with the trap drainage channel on the side of the flush toilet unit and the outlet 12 constituting the coupling with the drain pipe 2 differ in inside diameter, a step 9 is formed in the channel of the drain socket body 3 to establish a configuration that enables absorption of the difference in the inside diameters. The inside diameters of the inlet and outlet can be the same insofar as they conform to a drainage channel inner diameter stipulated by JIS (JIS-A5207) (so as in a siphon-jet toilet, for example, to completely pass a wooden sphere of 53 mm diameter). Waste does not accumulate on the step 9 because the step is not provided so as to reduce the channel diameter.

The number of straightening vanes is made two or more in order to better align the direction of waste and shred toilet paper during passage of flushing water. A number of straightening vanes exceeding 16 is unsuitable, because the spacing between the straightening vanes becomes small to increase the likelihood that waste will clog or remain and accumulate between them.

The effect of the straightening vanes increases with increasing length inward from the inner wall of the channel. A length under 1 mm is too small to exhibit the effect of aligning the direction of waste and shredding toilet paper. On the other hand, when the spacing of the straightening vanes in the horizontal direction at the section where the straightening vanes are provided is smaller than the inside diameter D2 of the outlet, a risk of clogging arises owing to the resulting narrowing of the channel. The length of the straightening vanes in the inward direction of the channel is therefore preferably not less than 1 mm and not greater than (D1−D2)/2 mm, where D1 is the inside diameter of the channel inner wall at the section where the straightening vanes are provided and D2 is the inside diameter of the outlet of the drain socket.

A straightening vane thickness of less than 2 mm is unsuitable, because at such a thickness the straightening vanes themselves are incapable of withstanding the impact during flushing and passage of waste and, moreover, it becomes impossible to obtain the required strength of attachment with the drain socket inner wall. Moreover, a straightening vane thickness exceeding 40 mm is unsuitable, because at such a thickness the spacing between the straightening vanes becomes too small, increasing the likelihood that waste will clog or remain and accumulate between them. The straightening vane thickness is therefore defined as not less than 2 mm and not greater than 40 mm, so to enable a drain socket that is capable both of eliminating the aforesaid problems and of achieving an early siphon effect producing effect owing to reduction of the channel volume. Therefore, the thickness of the straightening vane is made not less than 2 mm and not greater than 40 mm, preferably not less than 2 mm and not greater than 30 mm, more preferably not less than 3 mm and not greater than 20 mm.

Further, effective waste alignment and toilet paper shredding during passage of flushing water can be enabled by defining the spacing between the tips of the straightening vanes in the inward direction of the channel to be not greater than 100 mm. A spacing between the tips of the straightening vanes in the inward direction of the channel of less than 10 mm is unsuitable, because the spacing between the straightening vanes becomes too small, increasing the likelihood that waste will clog or remain and accumulate between them.

The flushing water passing downward from the inlet 8 flows down along the inner wall of the channel expansion section 10, collides with the channel contraction section 11, splashes vigorously in the inward direction of the channel to produce a turbulent state inside the channel, thereby forming a water curtain and causing the trap drainage channel to become filled with water so as to induce a siphon effect. This method of inducing a siphon effect can be readily achieved by narrowing the pipe diameter, forming a step such as a projection, or, as in the prior art, forming an orifice. In the present embodiment, the channel contraction section 11 is the siphon inducing region.

As explained in the foregoing, the provision of the straightening vanes 4 in the drain socket body 3 makes the channel volume of the drain socket body 3 somewhat smaller than it would be if the straightening vanes 4 were not provided. Flushing water passing downward from the inlet 8 collides with the straightening vanes and splashes in the inward direction of the channel to produce turbulence. The turbulent state produced by the straightening vanes 4 and the reduced channel volume work in combination to enable early establishment of a water-filled state, thereby making it possible to shorten the time needed to produce a siphon effect. Slender pieces of waste passing downward from the inlet 8 collide with the straightening vanes 4 to be aligned in the direction of the flushing water flow, any toilet paper wadded into a large ball passes downward from the inlet 8 to collide with the straightening vanes 4 and be finely shredded, and both are discharged to the outside from the outlet 12 without blocking the channel. The straightening vanes 4 can be given a tapered shape that is thick on the wall side and grows thinner in the inward direction of the channel or be given a rectangular shape. The attachment angle of the straightening vanes 4 can be made perpendicular or oblique with respect to the channel wall.

The channel expansion section 10 is formed in the channel of the drain socket body 3 so as to progressively enlarge the inside diameter of the channel from the inlet 8 toward the outlet 12, so that the flushing water passing downward from the inlet 8 first collides with the wall of the channel expansion section 10 to cause temporary retention of flushing water. Next, since the channel contraction section 11 formed following the channel expansion section 10 progressively decreases in inside diameter in the direction of the water flow, the flushing water that has passed through the channel expansion section 10 in the foregoing manner collides with the inner wall of the channel contraction section 11 to splash in the inward direction of the channel and produce a turbulent state. The temporary retention of the flushing water caused by the channel expansion section 10 and the production of the turbulent state produced by the channel contraction section 11 work in combination to enable early establishment of a water-filled state, thereby making it possible to shorten the time needed to produce a siphon effect. Thanks to the negative gradient given the channel contraction section 11, waste does not remain and accumulate on the inner wall. Owing to gentle slop given the channel expansion section 10, the flushing water flows downward along the inner wall to cause temporary retention of the flushing water in the space consisting of the channel expansion section 10 and channel contraction section 11, and, in addition, the flushing water efficiently splashes off the channel contraction section 11 in the inward direction of the conduit. The straightening vanes 4 are preferably formed to start from the beginning of the channel expansion section 10 because this prevents waste from flowing toward the expansion region. Although not shown in the drawings, the boundary region between the channel expansion section 10 and channel contraction section 11 can be constituted as a divisible structure for enabling separation of the upper half of the drain socket and the lower half of the drain socket.

Formation of the boundary region between the channel expansion section and channel contraction section as a divisible structure, i.e., a structure enabling separation or disconnection, is preferable because in such case the upper half of the drain socket can be manufactured in a number of types matched to the diameter of the outlet of the trap drainage channel of the flush toilet unit and/or the height of the outlet from the floor, the lower half of the drain socket can be manufactured in a number of types matched to the bore of the floor drain pipe, and the two can be appropriately selected in accordance with the specifications of the trap drainage channel of the flush toilet unit and the floor drain pipe to constitute an integrated drain socket. It is also preferable because when a problem arises inside the drain socket, the drain socket can be dismantled to check the cause.

Although the flush toilet unit and drain socket are separate units to be joined in the foregoing embodiment, it is alternatively possible to configure a flush toilet that integrates the drain socket and flush toilet unit.

Figure 3:
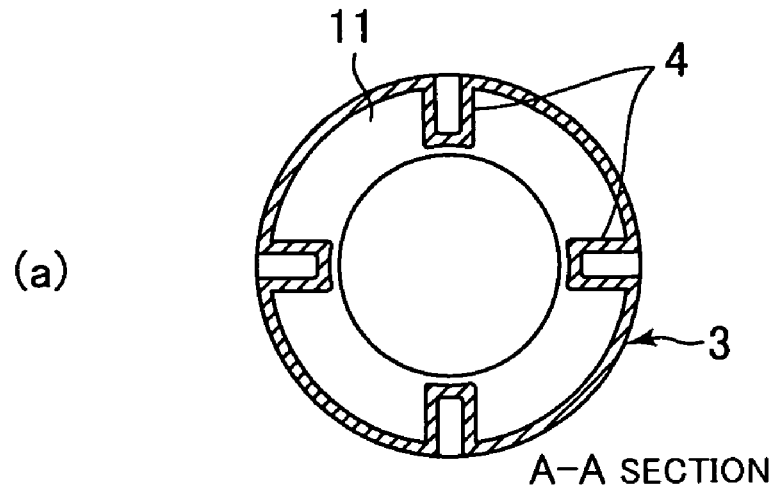
FIG. 3 is a set of diagrams showing a drain socket according to a second embodiment of the present invention, wherein (a) is a cross-sectional view and (b) is a vertical sectional view.
Figure 3:
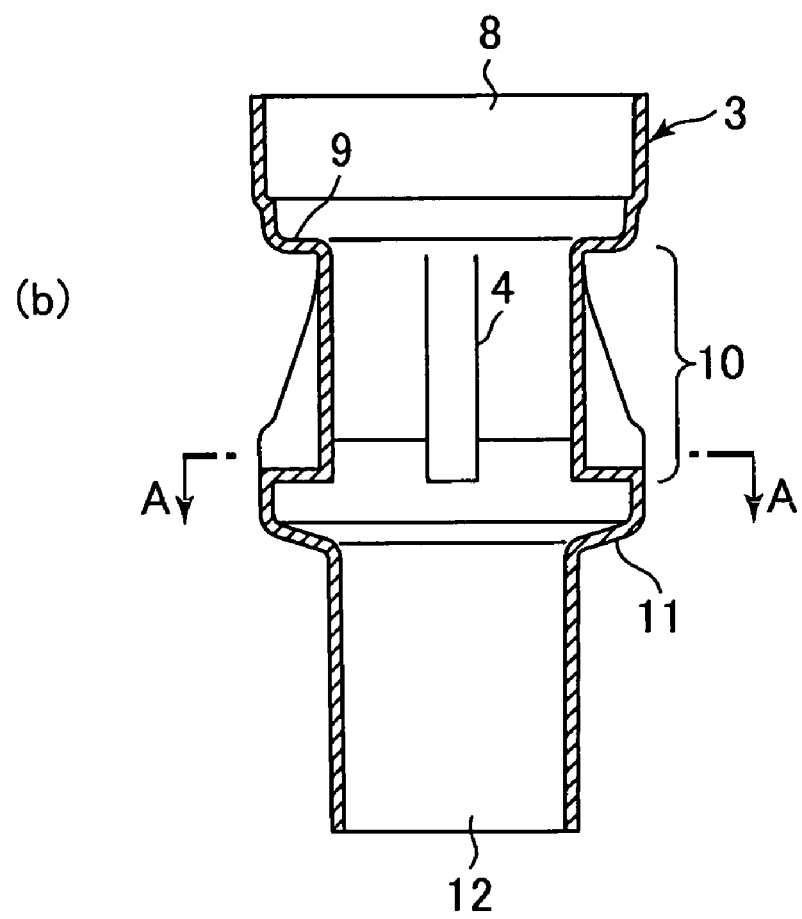

FIG. 3 is a set of diagrams showing a drain socket that is a second embodiment of the present invention. As shown at (a) and (b) of FIG. 3, the channel of the drain socket body 3 is formed therein with a channel expansion section 10 in which the inside diameter of the channel progressively increases from the inlet 8 toward the outlet 12 and an ensuing channel contraction section 11 in which the inside diameter of the channel progressively decreases in the direction of water flow. Multiple straightening vanes 4 are provided in the channel of the channel expansion section 10 to extend into the channel from the wall thereof. This drain socket is characterized in that the thickness of the straightening vanes 4 is greater than the straightening vanes 4 shown in FIGS. 1 and 2. Further, owing to the fact that the inlet 8 constituting the coupling with the trap drainage channel on the side of the flush toilet unit and the outlet 12 constituting the coupling with the drain pipe differ in inside diameter, a step 9 is formed in the channel of the drain socket body 3 to establish a configuration that enables absorption of the difference in the inside diameters.

Although the straightening vanes 4 have the same effect as those of the first embodiment, the straightening vanes 4 of this embodiment are smaller in number but greater in thickness, so that they are advantageous in terms of strength and make it possible to achieve the same effect with a reduced number of the straightening vanes. The basic effect of the channel expansion section 10 and outlet 12 is the same as in the first embodiment. Although not illustrated, the boundary region between the channel expansion section 10 and channel contraction section 11 can be constituted to enable separation of the upper half of the drain socket and the lower half of the drain socket.

Figure 4:
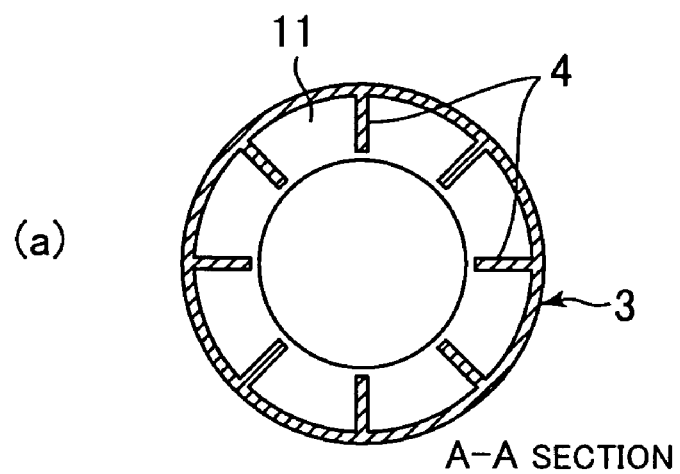
FIG. 4 is a set of diagrams showing a drain socket according to a third embodiment of the present invention, wherein (a) is a cross-sectional view and (b) is a vertical sectional view.
Figure 4:
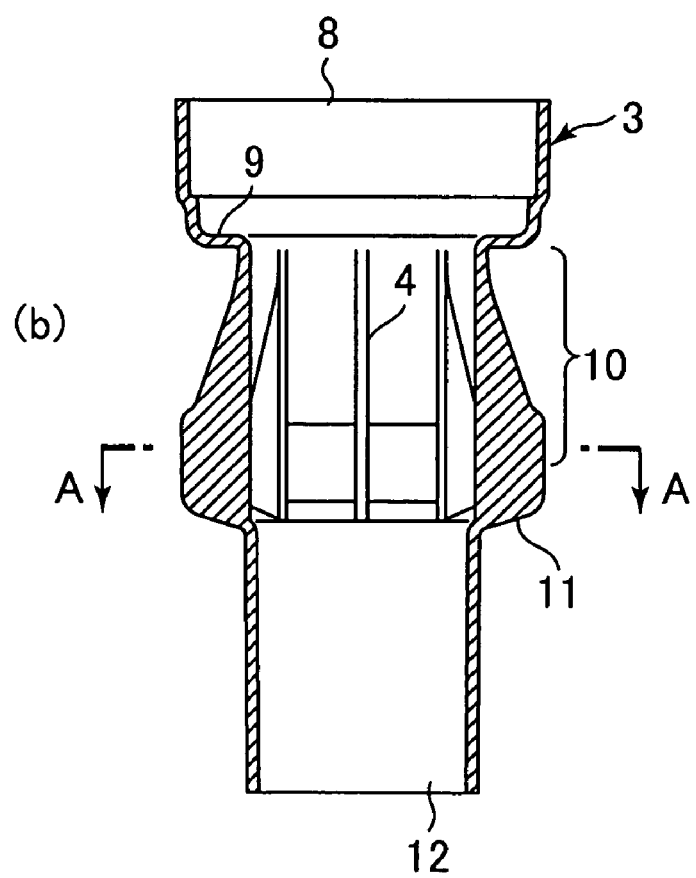

FIG. 4 is a set of diagrams showing a drain socket that is a third embodiment of the present invention. As shown at (a) and (b) of FIG. 4, the channel of the drain socket body 3 is formed therein with a channel expansion section 10 in which the inside diameter of the channel progressively increases from the inlet 8 toward the outlet 12 and an ensuing channel contraction section 11 in which the inside diameter of the channel progressively decreases in the direction of water flow. The region of the channel from the channel expansion section 10 to the channel contraction section 11 is provided therein with multiple straightening vanes 4 that extend into the channel from the wall thereof. Further, owing to the fact that the inlet 8 constituting the coupling with the trap drainage channel on the side of the flush toilet unit and the outlet 12 constituting the coupling with the drain pipe differ in inside diameter, a step 9 is formed in the channel of the drain socket body 3 to establish a configuration that enables absorption of the difference in the inside diameters.

Although the straightening vanes 4 have the same effect as those of the first embodiment, the straightening vanes 4 of this embodiment are longer than those of the first embodiment and configured to extend across not only the channel expansion section 10 but also the channel contraction section 11. This structure further enhances the alignment of waste by the straightening vanes 4, making the likelihood of waste remaining and accumulating on the inner wall of the channel contraction section 11 even smaller than in the first embodiment. The basic effect of the channel expansion section 10 and outlet 12 is the same as in the first embodiment.

Figure 5:
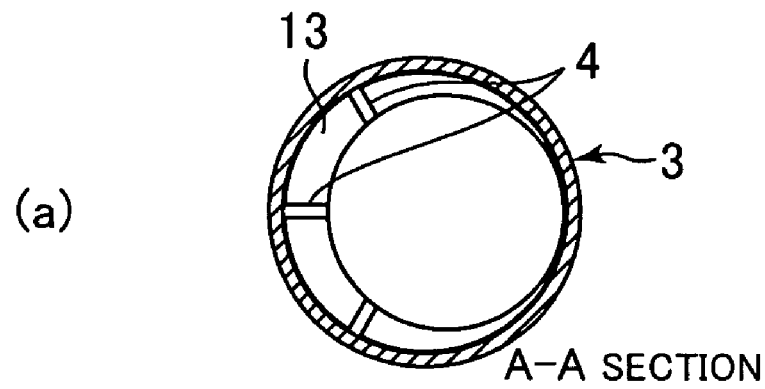
FIG. 5 is a set of diagrams showing a drain socket according to a fourth embodiment the present invention, wherein (a) is a cross-sectional view and (b) is a vertical sectional view.
Figure 5:
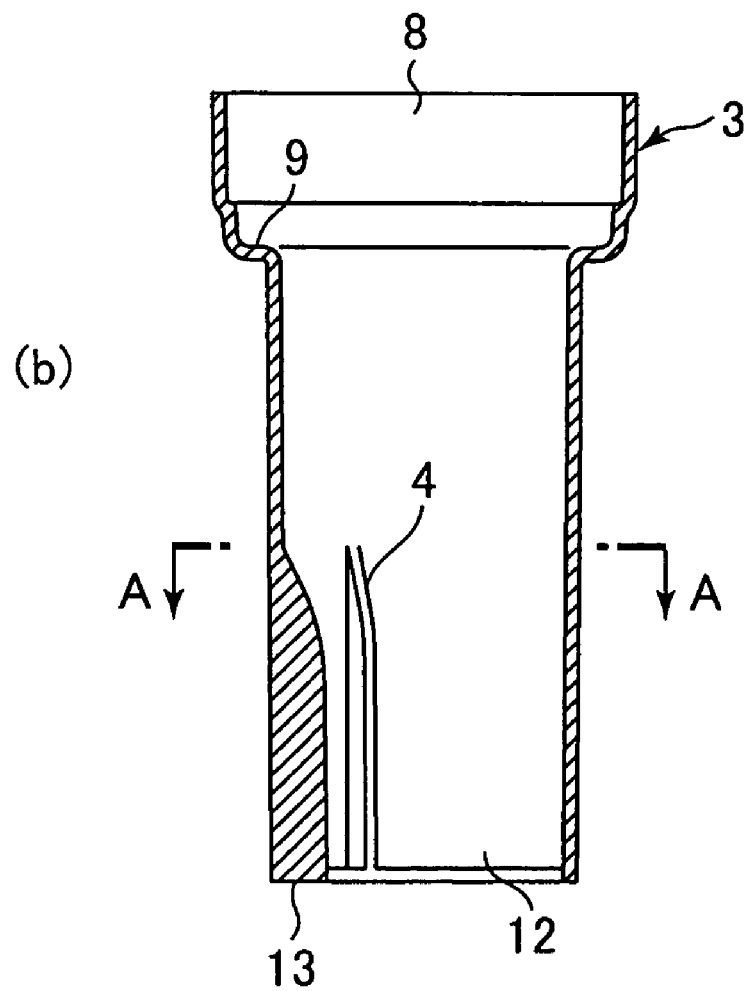

FIG. 5 is a set of diagrams showing a drain socket that is a fourth embodiment of the present invention. Owing to the fact that, as shown at (a) and (b) of FIG. 5, the inlet 8 constituting the coupling with the trap drainage channel of the flush toilet unit and the outlet 12 constituting the coupling with the drain pipe differ in inside diameter, a step 9 is formed toward the side of the inlet 8 of the drain socket body 3 and a contraction step 13 is formed near the outlet 12 to establish a configuration that enables absorption of the difference in the inside diameters. The contraction step 13 functions as a siphon inducing region; flushing water passing downward from the inlet 8 collides with the contraction step 13 and splashes in the inward direction of the channel to form a water curtain in the channel. Multiple straightening vanes 4 are provided in the vicinity of the contraction step 13 to extend in the inward direction of the channel from the wall.

The basic effect of the straightening vanes 4 is the same as those of the first embodiment. This structure that puts the contraction step 13 and straightening vanes 4 in contact ensures that waste does not remain and accumulate on the contraction step 13.

Figure 6:
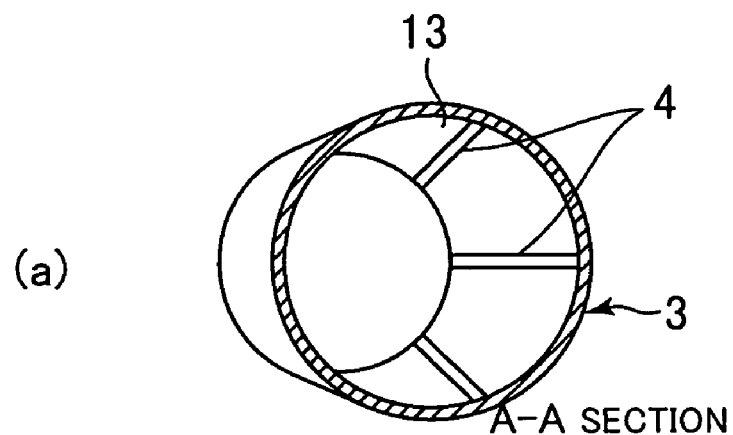
FIG. 6 is a set of diagrams showing a drain socket according to a fifth embodiment the present invention, wherein (a) is a cross-sectional view and (b) is a vertical sectional view.
Figure 6:
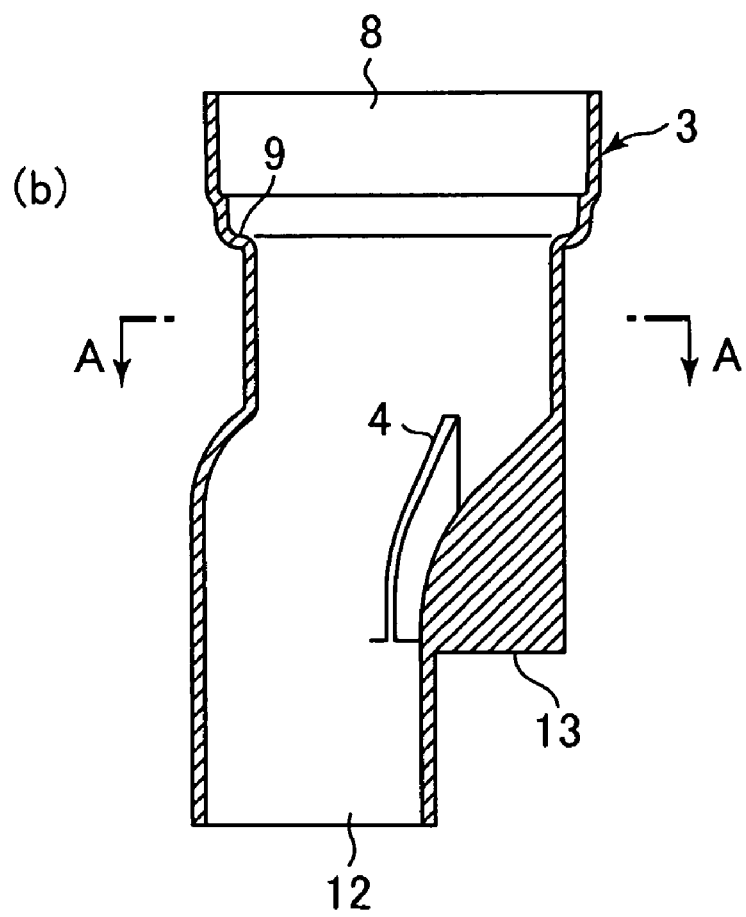

FIG. 6 is a set of diagrams showing a drain socket that is a fifth embodiment of the present invention. Owing to the fact that, as shown at (a) and (b) of FIG. 6, the inlet 8 constituting the coupling with the trap drainage channel of the flush toilet unit and the outlet 12 constituting the coupling with the drain pipe differ in inside diameter and the location of the centers of their diameters in the horizontal direction, a step 9 is formed toward the side of the inlet 8 of the drain socket body 3 to absorb the diameter difference and a contraction step 13 is formed toward the side of the outlet 12 to establish a configuration that enables absorption of the difference in location of the centers of the diameters in the horizontal direction. The contraction step 13 functions as a siphon inducing region; flushing water passing downward from the inlet 8 collides with the contraction step 13 and splashes in the inward direction of the channel to form a water curtain in the channel.

The basic effect of the straightening vanes 4 is the same as those of the first embodiment. This structure that puts the contraction step 13 and straightening vanes 4 in contact ensures that waste does not remain and accumulate on the contraction step 13.

Figure 7:
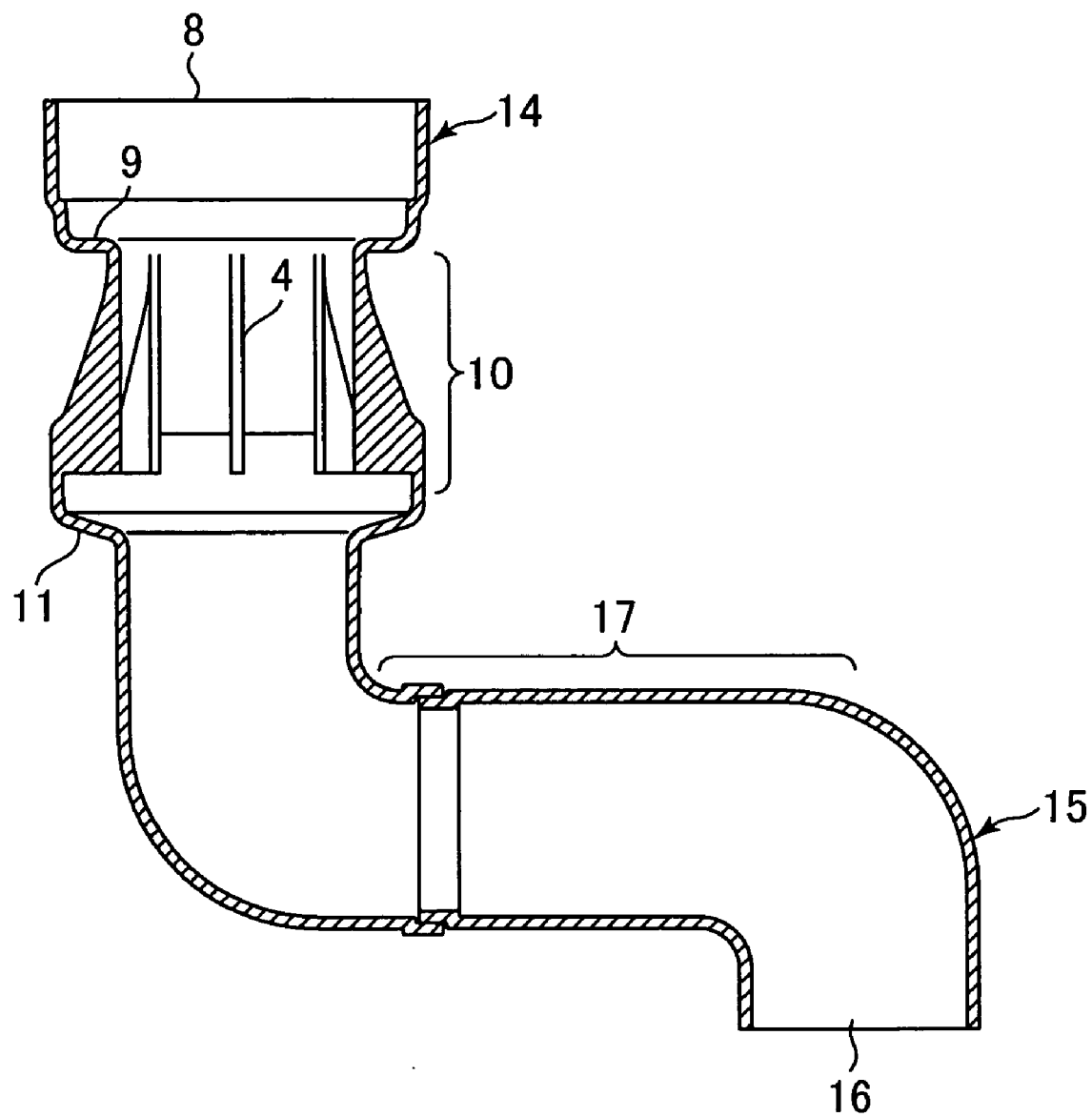
FIG. 7 is a vertical sectional view showing a drain socket that is a sixth embodiment of the present invention.

FIG. 7 is diagram showing a drain socket that is a sixth embodiment of the present invention. As shown in FIG. 7, the channel of a toilet socket module 14 is formed therein with a channel expansion section 10 in which the inside diameter of the channel progressively increases from the inlet 8 toward the outlet 12 and an ensuing channel contraction section 11 in which the inside diameter of the channel progressively decreases in the direction of water flow. Multiple straightening vanes 4 are provided in the channel of the channel expansion section 10 to extend into the channel from the wall thereof. Further, owing to the fact that the inlet 8 constituting the coupling with the trap drainage channel of the flush toilet unit and an outlet 16 of a lateral pipe section 17 and a drain pipe socket module 15 pipe differ in inside diameter, a step 9 is formed in the channel of the toilet socket module body 14 to establish a configuration that enables absorption of the difference in the inside diameters.

Straightening vanes 4 in the toilet socket module 14 have the same effect as those of the first embodiment, while the effect of a channel expansion section 10 and a channel contraction section 11 are also the same effect as those of the first embodiment. Owing to the adoption of a three-component structure wherein the lateral pipe section 17 is provided to make the channel downstream of the toilet socket module 14 parallel to the floor and the drain pipe socket module 15 is provided thereafter, it is possible in the case of replacing an existing flush toilet unit with a new one to install the new toilet without need for work involving the floor drain pipe even if the location of the floor drain pipe should be out of alignment with the terminal outlet of the trap drainage channel of the new flush toilet unit.

Although in the foregoing embodiment the location at which the straightening vanes are formed is to the upstream side from about the same location as that where the siphon effect is induced, the lowermost ends (most downstream ends) of the straightening vanes can be spaced apart from the siphon effect inducing region or can be located on the downstream side thereof, i.e., it suffices to dispose them so that the momentum of the flushing water passing downward form the inlet collides with the siphon inducing region without being impeded by waste and the like.

Figure 8:
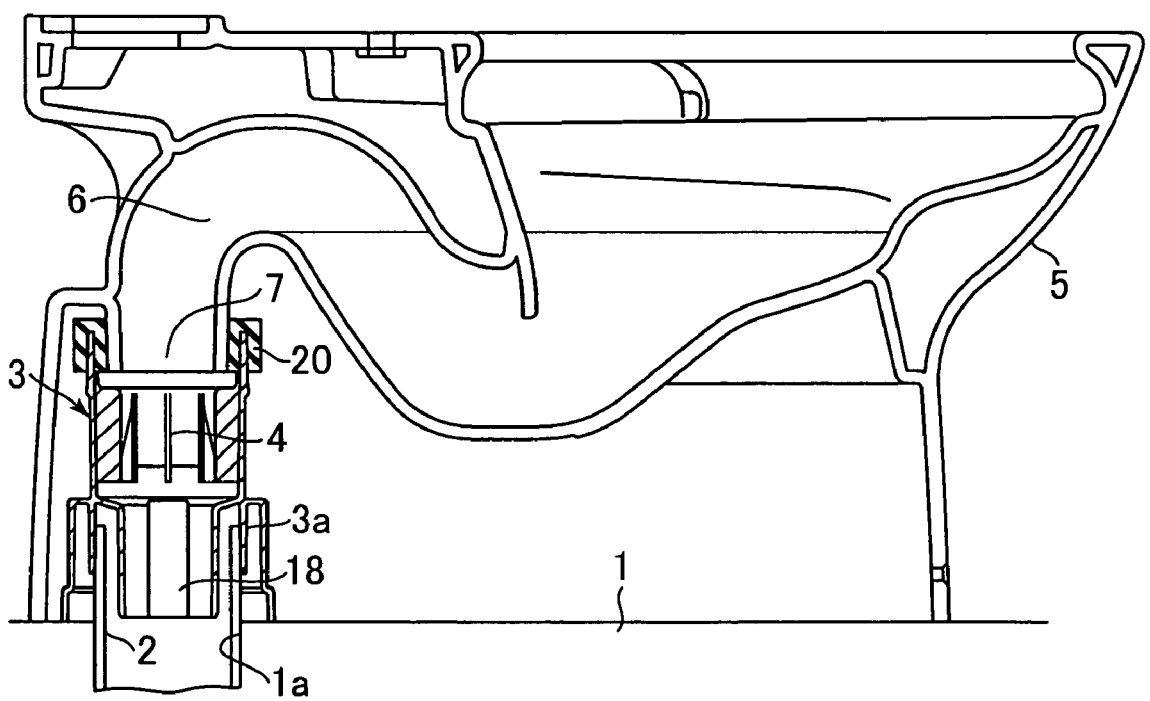
FIG. 8 is a vertical sectional view showing a drain socket and a coupling structure between a flush toilet unit and drain pipe according to a seventh embodiment of the present invention.
Figure 9:
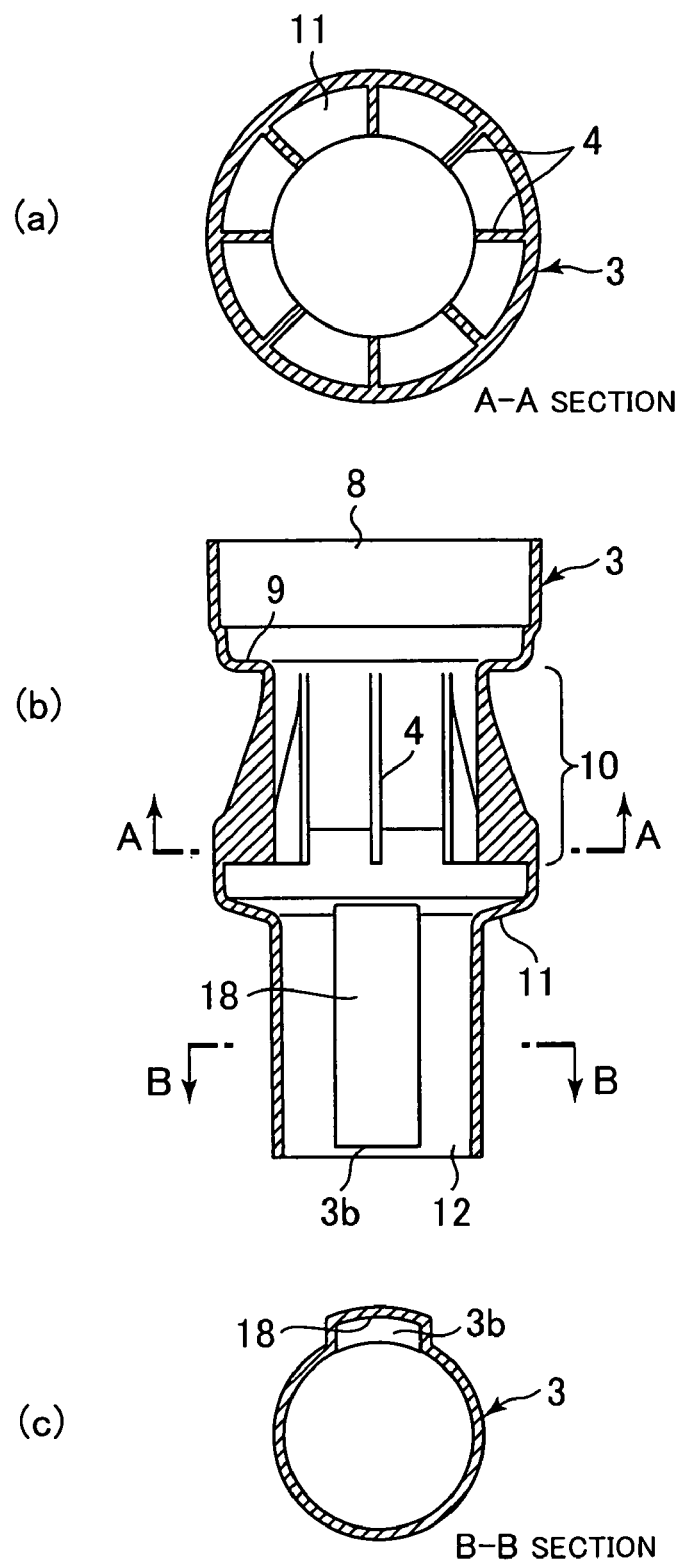
FIG. 9 is a set of diagrams showing the drain socket according to the seventh embodiment of the present invention, wherein (a) is a cross-sectional view taken along A-A, (b) is a vertical sectional view and (c) is a cross-sectional view taken along B-B.

FIG. 8 is a vertical sectional view showing a drain socket and a coupling structure between a flush toilet unit and drain pipe according to a seventh embodiment of the present invention. FIG. 9 is a set of enlarged views of a main body showing the drain socket section of FIG. 8 with the coupling structure portion cut away.

In FIG. 8, a drain pipe 2 is shown to rise through a hole 1*a* formed in a floor 1. The drain pipe 2 is water-tightly fastened to an outlet 7 of a trap drainage channel 6 of a flush toilet unit 5 installed on the floor 1 and to a drain socket body 3. The drain socket body 3 and the drain pipe 2 are joined by a coupling 3*a* The coupling 3*a* has a region having multiple inside/outside diameters for enabling adaptation to differences in the outside diameter of the drain pipe 2. The drain socket body 3 is water-tightly fastened to the trap drainage channel 6 by a packing 20. Since the drainage trap is subject to manufacturing error and some amount of diameter variation, the inside diameter of the inlet of the drain socket body 3 is made large and the error is adsorbed by the packing 20.

As shown at (a), (b) and (c) of FIG. 9, the inside of the channel of the drain socket body 3 is formed with a channel expansion section 10 in which the inside diameter of the channel progressively increases from the inlet 8 toward the outlet 12 and an ensuing channel contraction section 11 in which the inside diameter of the channel progressively decreases in the direction of water flow. Multiple straightening vanes 4 are provided in the channel of the channel expansion section 10 to extend into the channel from the wall thereof. Owing to the fact that the inlet 8 constituting the coupling with the trap drainage channel on the side of the flush toilet unit and the outlet 12 constituting the coupling with the drain pipe 2 differ in inside diameter, a step 9 is formed in the channel of the drain socket body 3 to establish a configuration that enables absorption of the difference in the inside diameters and, in addition, a single guide groove 18 is provided downstream of the channel contraction section 11 continuously in the direction of water flow. The guide groove 18 is a 7-mm deep, 67-mm long groove cut locally into the channel contraction section 11 to extend to its terminus at a step 3*b*. Its depth and length are defined so that the small amount of flowing water at the end of the siphoning explained later splashes from the terminus to induce a siphon effect, and may, for instance, be a depth of 1 mm-14 mm and a length of 55 mm-100 mm. No portion of the entire channel of the drain socket of this embodiment is smaller in diameter than the outlet 12. The inside diameters of the inlet and outlet can be the same insofar as they conform to a drainage channel inner diameter stipulated by JIS (JIS-A5207) (so as in a siphon-jet toilet, for example, to completely pass a wooden sphere of 53 mm diameter). Waste does not accumulate on the step 9 because the step is not provided so as to reduce the channel diameter.

At the final stage of flushing, the amount of flushing water flowing downward through the channel of the drain socket diminishes and the flushing water enters and flows downward through the guide groove. If the number of guide grooves is made two or more, the amount of flushing water flowing downward through the grooves at this time increases, so that the amount of flushing water colliding with the step provided at the termini of the guide grooves and splashing in the inward direction of the channel increases. As a result, siphoning can be more effectively induced in the vicinity of the guide groove termini. In addition, the contact area between large pieces of waste and the inner wall becomes smaller to lower frictional resistance therebetween, thereby enhancing the effect of preventing waste clogging owing to excessive frictional resistance. On the other hand, a number of guide grooves exceeding 16 is unsuitable because it makes the increase in the volume of the channel portion provided with the guide grooves too large, thereby necessitating a large amount of flushing water to produce siphoning and making it impossible to achieve the initially intended effect of the provided guide grooves, which is to induce siphoning with a small amount of flushing water. The number of guide grooves is therefore preferably not less than 2 and not greater than 16. Moreover, provision of many guide grooves by cutting away parts of the channel contraction section lowers the siphon-inducing effect of the channel contraction section, in which case provision of six or fewer is preferable.

A guide groove depth of less than 1 mm from the inner wall surface is unsuitable because in such case almost no splashing of flushing water can be obtained at the lower end of the guide groove, so that siphoning cannot be induced. A guide groove depth of greater than 15 mm is unsuitable because in such case the increase in the volume of the channel portion provided with the guide grooves becomes too large, thereby necessitating a large amount of flushing water to produce siphoning and making it impossible to achieve the initially intended effect of the provided guide grooves, which is to induce siphoning with a small amount of flushing water. The depth of the guide groove from the inner wall surface is therefore preferably not less than 1 mm and not greater than 15 mm.

A guide groove width of less than 2 mm is unsuitable because in such case flushing water passing downward along the inner wall from upstream does not readily enter the groove, so that siphoning cannot be induced because little flushing water splashes at the lower end of the guide groove.

A guide groove width of greater than 30 mm is unsuitable because in such case more waste comes into contact with the guide groove near the middle of its width, thereby making it impossible to achieve the effect of reducing frictional resistance by making the contact surface area of the guide groove small. The width of the guide groove is therefore preferably not less than 2 mm and not greater than 30 mm.

Owing to the provision of the straightening vanes 4 in the channel of the drain socket body 3 in the foregoing manner, slender pieces of waste passing downward from the inlet 8 together with the flushing water collide with the straightening vanes 4 to be aligned in the direction of the water flow, so that any toilet paper wadded into a large ball that passes downward from the inlet 8 collides with the straightening vanes 4 to be shredded or disintegrated, thereby making waste less likely to catch in the channel contraction section 11, so that both move downstream without clogging the channel. The straightening vanes 4 can be given a tapered shape that is thick on the wall side and grows thinner in the inward direction of the channel or be given a rectangular shape. The attachment angle of the straightening vanes 4 can be made perpendicular or oblique with respect to the channel wall. Waste that has passed through the channel contraction section 11 moves toward the outlet 12, but since large pieces of waste do not contact the interior of the guide grooves 18, the contact area of waste with the inner wall becomes small to enable reduction of frictional resistance and make it possible to prevent the clogging by large pieces of waste that has occurred in the past owing to excessively large frictional resistance. In the drain socket of this embodiment, no portion of the channel is smaller in diameter than the outlet 12 and, therefore, the channel contraction section 11 is also absent any factor hindering waste passage, so that very smooth waste discharge can be realized thanks to the contributing effect of reduced frictional resistance between waste and the inner wall produced by the guide grooves 18.

In addition, the channel expansion section 10 is formed in the channel of the drain socket body 3 so as to progressively enlarge the inside diameter of the channel from the inlet 8 toward the outlet 12, so that the flushing water passing downward from the inlet 8 between the early and intermediate flushing stages first collides with the wall of the channel expansion section 10 to cause temporary retention of flushing water. Next, since the channel contraction section 11 formed following the channel expansion section 10 progressively decreases in inside diameter in direction of the water flow, the flushing water that has passed through the channel expansion section 10 collides with the inner wall of the channel contraction section 11 to splash in the inward direction of the channel and produce a turbulent state. The temporary retention of the flushing water caused by the channel expansion section 10 and the production of the turbulent state produced by the channel contraction section 11 work in combination to enable early establishment of a water-filled state, thereby making it possible to shorten the time needed to produce a siphon effect. Thanks to the negative gradient given the channel contraction section 11, waste does not remain and accumulate on the inner wall. At the final flushing stage the amount of flushing water decreases, making it impossible to induce siphoning in the channel contraction section 11. However, substantially all of the diminished amount of flushing water passes downward along the channel inner wall and, therefore, owing to the provision of the guide grooves 18 on the downstream side of the channel contraction section 11, the flushing water enters the guide grooves 18 and flows downward within the grooves. The fact that flushing water passing downward along the inner wall of the channel can be directly introduced into guide grooves 18 formed by locally cutting away the contraction section makes this a particularly preferable embodiment. Moreover, since the flushing water within the grooves collides with the steps 3b provided at the ends of the guide grooves 18 to splash in the inward direction of the channel, siphoning can be induced at the terminal region of the guide grooves 18, thereby prolonging the duration of siphoning. Although not shown in the drawings, the boundary region between the channel contraction section 11 and guide grooves 18 can be constituted as a divisible structure for enabling separation of the upper half of the drain socket and the lower half of the drain socket.

Formation of the drain socket to have a divisible structure at the boundary region between the channel contraction section and the guide grooves, i.e., to have a structure enabling separation or disconnection, is preferable because in such case the upper half of the drain socket can be manufactured in a number of types matched to the diameter of the outlet of the trap drainage channel of the flush toilet unit and/or the height of the outlet from the floor, the lower half of the drain socket can be manufactured in a number of types matched to the bore of the floor drain pipe, and the two can be appropriately selected in accordance with the specifications of the trap drainage channel of the flush toilet unit and the floor drain pipe to constitute an integrated drain socket. It is also preferable because when a problem arises inside the drain socket, it can be dismantled to check the cause.

Figure 10:
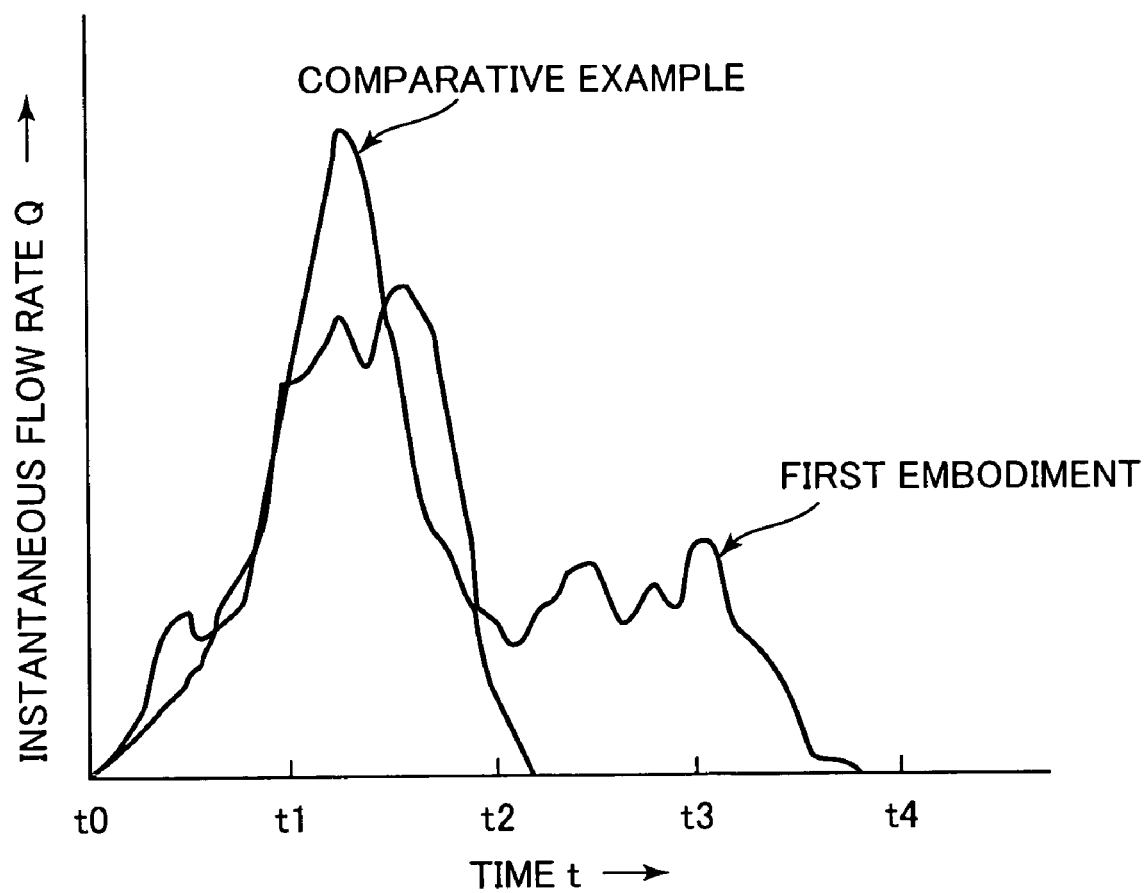
FIG. 10 is a graph for explaining how the amount of water flowing out of the outlet of the drain socket according to the seventh embodiment of the present invention during flushing varies with elapse of time.

FIG. 10 is a diagram for explaining how the amount of water flowing out of the outlet of the drain socket according to the seventh embodiment of the present invention during flushing varies with elapse of time. As a comparative example there was used a drain socket having the same structure as that of the seventh embodiment except that it was not formed with guide grooves. At the early stage of flushing (time t0-t1 in FIG. 10), almost all of the flushing water passing downward from the inlet 8 and colliding with the channel contraction section 11 splashed in the inward direction of the channel to form a water curtain and induce siphoning. As a result, a large water discharge quantity Q could be obtained. The reason for the instantaneous flow rate being lower than in the comparative example is thought to be because the channel contraction section 11 was formed with cutouts and the flushing water passed down into the cutouts, i.e., the guide grooves. On the other hand, when, for example, the combination of drain socket and toilet structure gives rise to a condition in which the instantaneous flow rate is so excessively high as to lower conveyance performance such that the flushing water flows downward leaving waste behind, this action of the instantaneous flow rate being slightly reduced at the initial flushing stage can also be utilized by locally cutting away the siphon inducing region (e.g., the channel contraction section) so that some of the flushing water flows directly thereinto. At the intermediate flushing stage (t1-t2 in FIG. 10), the amount of flushing water passing downward through the drain socket progressively decreased, but owing to the presence of the channel expansion section 10 on the upstream side of the channel contraction section 11, the decrease in the amount of flushing water was accompanied by flow thereof downward along the inner wall of the channel expansion section 10, thereby producing a delaying effect. As a result, it was possible despite the slight decrease in the amount of water to maintain siphoning at the channel contraction section 11 more readily than when the channel expansion section 10 was absent. At the final stage of flushing (t2-t3 in FIG. 10), the amount of flushing water passing downward through the channel of the drain socket decreased still further, making it impossible to induce siphoning in the channel contraction section 11. At this time, almost all of the reduced amount of flushing water passed downward along the inner wall of the channel and, owing to the provision of the guide grooves 18 on the downstream side of the channel contraction section 11, entered and flowed downward through the grooves. The flushing water in the grooves collided with the steps provided at the ends of the grooves to splash in the inward direction of the channel, thereby inducing siphoning near the ends of the guide grooves 18. It can be seen that, as a result, the effect of the guide grooves 18 held up the water discharge quantity Q especially during time t2-t3 in FIG. 10.

Moreover, inside the drain socket, the channel from immediately below the channel contraction section to the drain pipe helps to prolong siphoning that occurs upstream thereof. When the length L of the internal cylindrical portion extending to and having the same diameter as the outlet of the drain socket is smaller than the diameter D thereof, the effect of prolonging the duration of siphoning cannot be realized. Therefore, L is preferably made longer than D (L>D), so that the length of the guide grooves becomes longer, collision of the small amount of flushing water with the steps occurs more effectively, the flushing water splashes to form a water curtain, and the duration of siphoning is prolonged. Since the overall length of the drain socket is restricted by the location of the outlet of the trap drainage channel of the flush toilet unit and the location of the drain pipe, the design needs to be made to secure the longest length L as possible within the range of this restriction.

Figure 11:
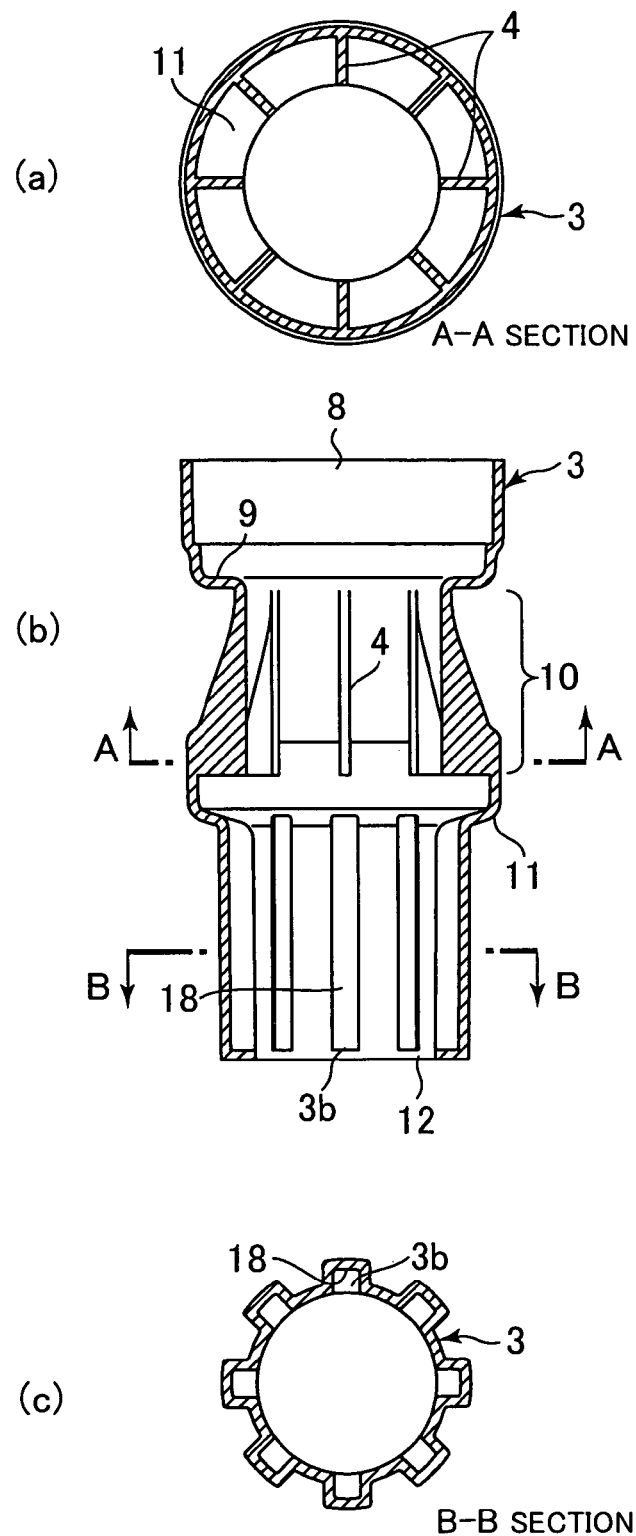
FIG. 11 is a set of diagrams showing a drain socket according to an eighth embodiment of the present invention, wherein (a) is a cross-sectional view taken along A-A, (b) is a vertical sectional view and (c) is a cross-sectional view taken along B-B.

FIG. 11 shows a drain socket that is an eighth embodiment of the present invention. As shown at (a), (b) and (c) of FIG. 11, the inside of the channel of the drain socket body 3 is formed with a channel expansion section 10 in which the inside diameter of the channel progressively increases from the inlet 8 toward the outlet 12 and an ensuing channel contraction section 11 in which the inside diameter of the channel progressively decreases in the direction of water flow. Multiple straightening vanes 4 are provided in the channel of the channel expansion section 10 to extend into the channel from the wall thereof. Owing to the fact that the inlet 8 constituting the coupling with the trap drainage channel on the side of the flush toilet unit and the outlet 12 constituting the coupling with the drain pipe differ in inside diameter, a step 9 is formed in the channel of the drain socket body 3 to establish a configuration that enables absorption of the difference in the inside diameters. In addition, multiple guide grooves 18 are provided downstream of the channel contraction section 11 continuously in the direction of water flow. The guide grooves 18 of this embodiment are characterized in being narrower in width and greater in number than the guide groove 18 of FIGS. 8 and 9. No portion of the entire channel of the drain socket of this embodiment is smaller in diameter than the outlet 12.

A spacing between the tips of the guide grooves in the inward direction of the channel of less than 5 mm is unsuitable because it makes the increase in the volume of the channel portion provided with the guide grooves too large, thereby necessitating a large amount of flushing water to produce siphoning and making it impossible to achieve the initially intended effect of the provided guide grooves, which is to induce siphoning with a small amount of flushing water. On the other hand, a spacing between the tips of the guide grooves in the inward direction of the channel of greater than 100 mm is unsuitable because in such case the contact area of waste with portions of the inner wall of the channel other than the guide grooves becomes large, making it impossible to achieve the effect of reducing frictional resistance by making the contact surface area of the guide grooves small. The spacing between the tips of the guide groove in the inward direction of the channel is therefore preferably not less than 5 mm and not greater than 100 mm.

The effects of the straightening vanes 4 and channel expansion section 10 and of the channel contraction section 11 are the same as those in the case of the seventh embodiment. Although the guide grooves 18 have the same effect as those of the seventh embodiment, they are advantageous in that since they are narrower in width owing to the larger number of the guide grooves 18 provided in this embodiment they have the effect of guiding more flushing water into the guide grooves when the amount of flushing water diminishes at the final flushing stage and in that they make the contact area with large pieces of waste smaller.

Although not shown in the drawings, the boundary region between the channel contraction section 11 and guide grooves 18 can be constituted as a divisible structure for enabling separation of the upper half of the drain socket and the lower half of the drain socket.

Figure 12:
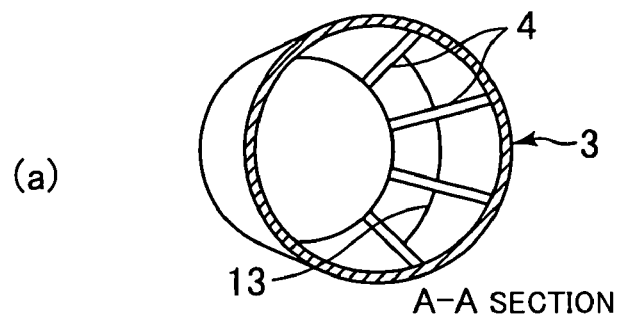
FIG. 12 is a set of diagrams showing a drain socket according to a ninth embodiment of the present invention, wherein (a) is a cross-sectional view taken along A-A, (b) is a vertical sectional view and (c) is a cross-sectional view taken along B-B.
Figure 12:
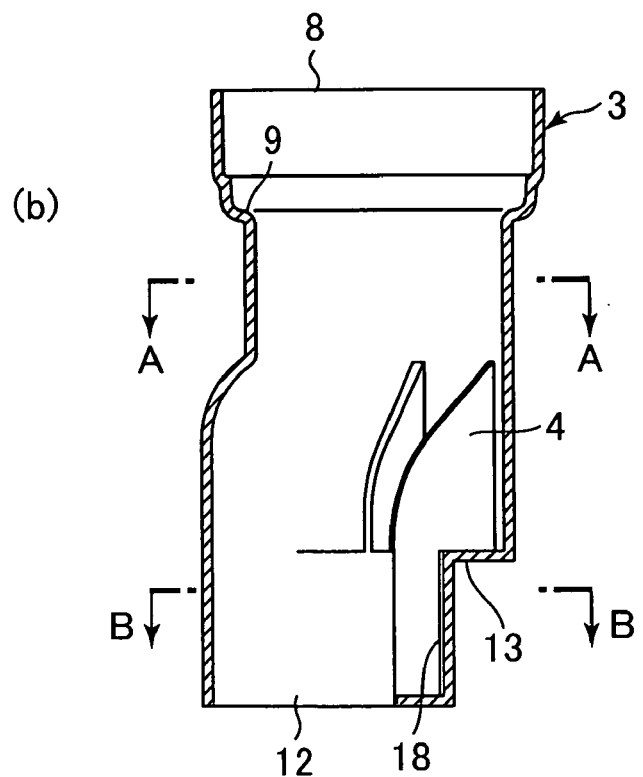
Figure 12:
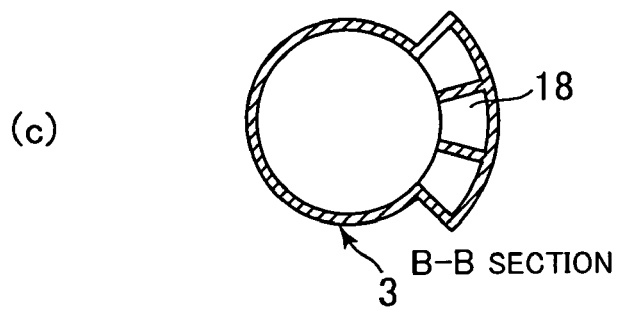

FIG. 12 is a set of diagrams showing a drain socket that is a ninth embodiment of the present invention. As shown at (a), (b) and (c) of FIG. 12, a contraction step 13 is formed in the channel of the drain socket body 3 between the inlet 8 and outlet 12. Since the inlet 8 constituting the coupling with the trap drainage channel of the flush toilet unit and outlet 12 constituting the coupling with the drain pipe differ in inside diameter and in the location of the centers of their diameters in the horizontal direction, a step 9 is formed toward the side of the inlet 8 of the drain socket body 3 to absorb the diameter difference and the contraction step 13 is formed toward the side of the outlet 12 to establish a configuration that enables absorption of the difference in the location of the centers of the diameters in the horizontal direction. Multiple straightening vanes 4 are provided on the upstream side of the contraction step 13 to extend in the inward direction of the channel. Multiple guide grooves 18 are provided on the downstream side of the contraction step 13 to extend continuously in the direction of water flow. No portion of the entire channel of the drain socket of this embodiment is smaller in diameter than the outlet 12.

The effects of the straightening vanes 4 and guide grooves 18 are the same as those in the case of the seventh embodiment. The contraction step 13 functions as a siphon inducing region; flushing water passing downward from the inlet 8 collides with upper surface of the contraction step 13 and splashes in the inward direction of the channel to form a water curtain in the channel. Although not shown in the drawings, a structure can be adopted that uses the contraction step 13 as a boundary for enabling division into a drain socket upper half and a drain socket lower half.

Although structures formed with straightening vanes were described in the foregoing embodiments as preferable modes for preventing the vicinity of the first siphon inducing region (the channel contraction section in the forgoing embodiments) from being clogged by waste and the like and thus enabling smooth discharge of flushing water, the present invention does not necessarily require straightening vanes. This is because it is the aforesaid guide grooves that help to sustain siphoning.

Further, although the siphon inducing region was defined as a channel contraction section, the channel contraction section is not limited to a channel contraction section formed in combination with a channel expansion section as in the seventh and eighth embodiments or one formed by a step (shelf) as in the ninth embodiment and can instead be applied to one provided with an orifice or simply provided with a projection.

Figure 13:
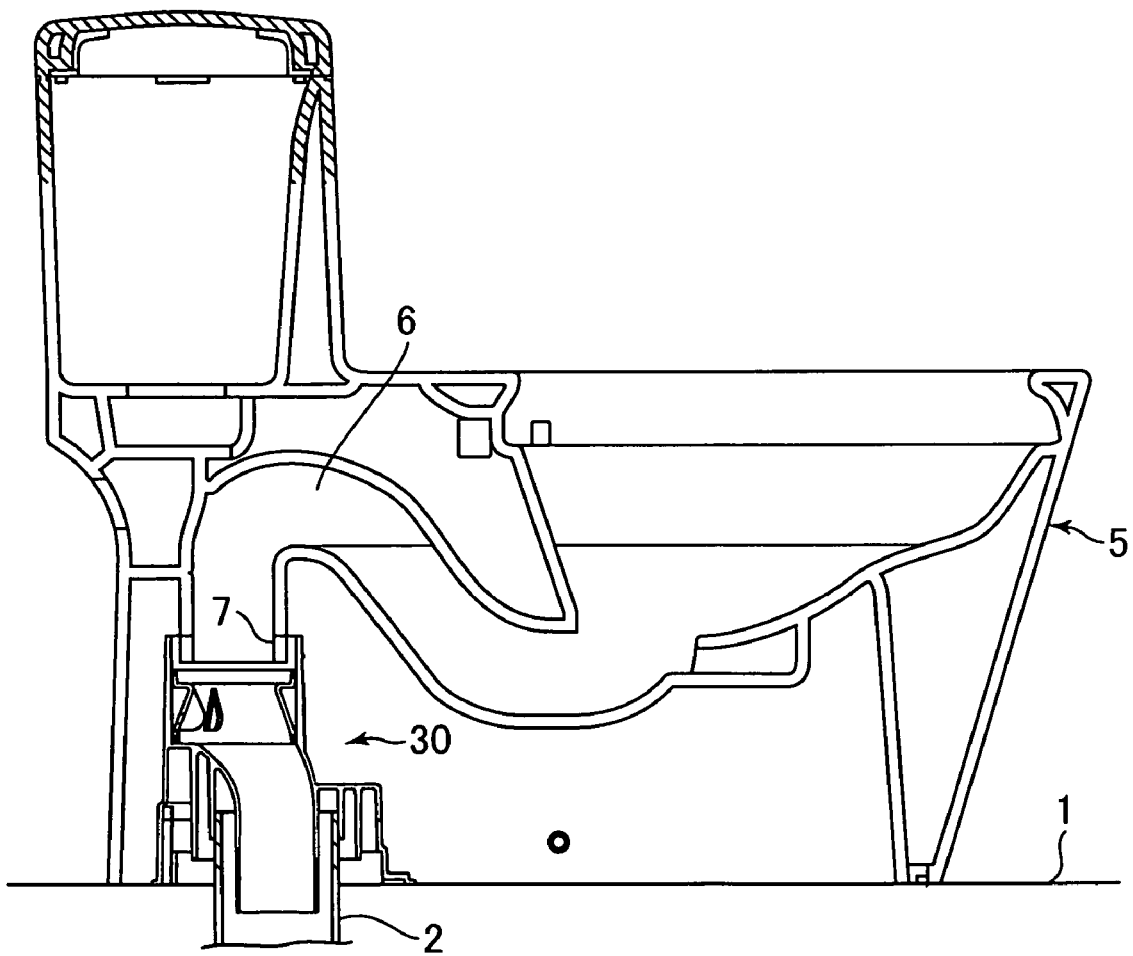
FIG. 13 is a sectional view showing a flush toilet unit to which a drain socket that is a tenth embodiment of the present invention is attached.
Figure 14:
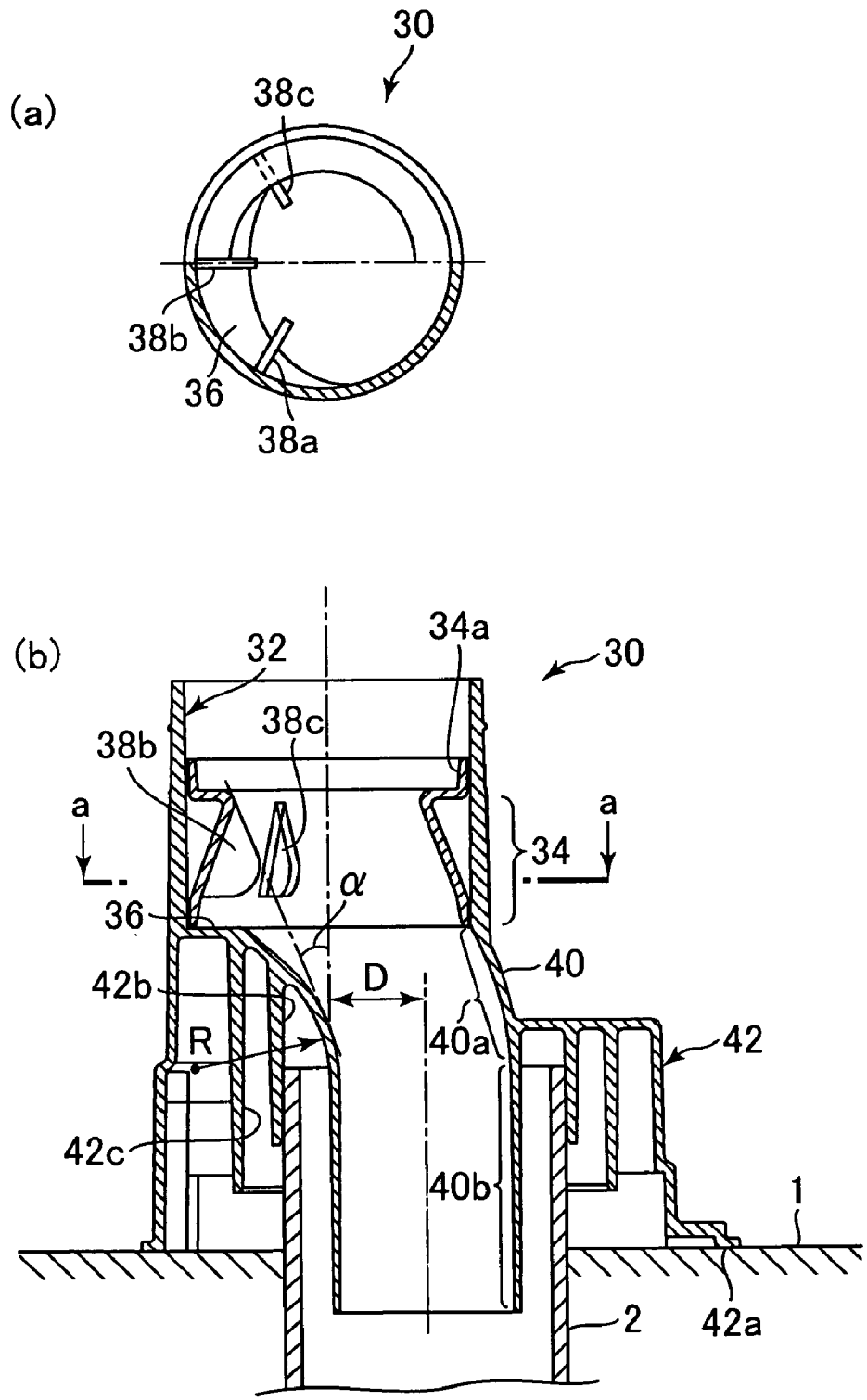
FIG. 14 is a set of diagrams showing the drain socket according to the tenth embodiment of the present invention, wherein (a) is a cross-sectional view taken along a-a and (b) is a vertical sectional view.

A tenth embodiment of the present invention will next be explained with reference to FIGS. 13 and 14. The drain socket of the tenth embodiment of the present invention is used when the center axis of terminal outlet of the trap drainage channel of the flush toilet unit is not aligned with center axis of the drain pipe outside the toilet. FIG. 13 is a sectional view showing how a flush toilet unit is installed using the drain socket of the tenth embodiment of the present invention. FIG. 14 is a set of sectional views of the drain socket of the tenth embodiment of the present invention, wherein (a) is a half section viewed from the upper surface of the drain socket and (b) is a full section of the drain socket viewed from the front. The lower half of (a) in FIG. 14 is a section taken at a-a of (b).

As shown in FIG. 14, the drain socket 30 of the tenth embodiment of the present invention has an inlet 32 to be connected to the end 7 of the trap drainage channel 6 of a flush toilet unit 5, a conical channel expansion section 34 concentrically coupled with the inlet 32 and expanding in diameter in the downstream direction, and a bent pipe 40 that joins the downstream end of the channel expansion section 34 and a drain pipe 2. The lower end of the channel expansion section 34 is formed with a crescent-shaped siphon inducing shelf 36 and the wall of the channel expansion section 34 on the side in the direction opposite from the direction of eccentricity is formed with three deflector plates 38a, 38b, 38c. The bent pipe 40 is formed therearound with a coupling flange 42 that is substantially concentric with the bent pipe.

As shown at (b) of FIG. 14, the center axis of the channel expansion section 34 and the center axis of the drain pipe 2 are offset by distance D. In this embodiment, the distance D is 40 mm. However, the distance D can be appropriately changed in accordance with the shape of the flush toilet unit to which it is applied and the location of the drain pipe. Application is preferably made in cases where the distance D is 10 to 50 mm, more preferably in cases where the distance D is 30 to 40 mm. When the no straight pipe portion is formed at the downstream end of the bent pipe 40, the distance D can be made 70 to 80 mm. In this specification and the claims, the direction from the center axis of the channel expansion section 34 toward the center axis of the drain pipe 2 is called the direction of eccentricity. Therefore, in (b) of FIG. 14, the rightward direction is the direction of eccentricity.

The inlet 32 is formed to a size that enables insertion of the end 7 of the trap drainage channel 6 of the flush toilet unit 5. The channel expansion section 34 communicates with the inlet 32 and has the shape of a truncated cone that expands progressively toward the downstream side. The top of the channel expansion section 34 is formed with a dish-shaped flange 34a designed to have an outside diameter that is somewhat smaller than the inside diameter of the inlet, and the inner surface of the inlet 32 and the outer surface of the flange 34a are water-tightly sealed with an adhesive or the like. The inside diameter of the upstream end of the channel expansion section 34 is formed to be smaller than the diameter of the inlet 32. In this embodiment, the inside diameter of the upstream end of the channel expansion section 34 is 58 mm and inside diameter of the lower end thereof is 88.5 mm.

The siphon inducing shelf 36 is constituted as a substantially horizontal flat surface formed between the downstream end of the channel expansion section 34 and the upstream end of the bent pipe 40. As shown at (a) of FIG. 14, the siphon inducing shelf 36 is an elongated crescent shape that is widest at a location on the side in the direction opposite from the direction of eccentricity and progressively narrows in width in opposite directions along the inner periphery from this location. In this embodiment, the width of the siphon inducing shelf 36 at the location of greatest width is 18 mm. Therefore, the inside edge of the siphon inducing shelf 36 at the location of greatest width is positioned about 3 mm radially inward from the inner diameter of the upstream end of the channel expansion section 34.

The deflector plates 38a, 38b, 38c are flat plates of generally triangular shape that extend radially from the inner wall of the channel expansion section 34 toward the center axis of the channel expansion section 34. The middle deflector plate 38b is formed at a location of the channel expansion section 34 on the side in the direction opposite from the direction of eccentricity and the deflector plates 38a, 38c are formed on opposite sides of the deflector plate 38b to be spaced 60 degrees therefrom. The deflector plate 38b is formed to have a first side of its triangular shape joined to the inner wall of the channel expansion section 34, a second side directed substantially horizontally to lie substantially parallel to the siphon inducing shelf 36, and a third side directed to make an angle α with a vertical axis of 23 degrees. An extension of the third side lies tangent to the inner wall of the bent pipe 40 on the side in the direction opposite from the direction of eccentricity. The apex between the second side and the third side is rounded. The deflector plates 38a, 38c are formed in the same shape as the deflector plate 38b. In this embodiment, the thickness of the deflector plates 38a, 38b, 38c is 3 mm and the edges thereof are rounded at a radius of curvature of 1.5 mm. The distance between the second sides and the siphon inducing shelf 36 is 10 mm. This distance is preferably set between 5 and 15 mm.

The bent pipe 40 has a bent region 40a joined with the lower end of the channel expansion section 34 and a straight pipe region 40b continuing on from the lower end of the bent region 40a. The upper end of the bent region 40a on the side in the direction opposite from the direction of eccentricity continues into the inner edge of the siphon inducing shelf 36. The upper end of the bent region 40a on the side in the direction of eccentricity continues into the lower end of the channel expansion section 34 substantially flatly. In this embodiment, the inside diameter of the straight pipe region 40b is 54.5 mm. The radius of curvature R of the surface of the bent region 40a on the side in the direction opposite from the direction of eccentricity is 53.5 mm.

The substantially cylindrical coupling flange 42 is formed to be substantially concentric with the straight pipe region 40b of the bent pipe 40. The lower surface 42a of the coupling flange 42 is formed to contact the floor 1 when the drain socket 30 is installed. The lower end of the straight pipe region 40b of the bent pipe 40 is formed to project downward beyond the lower surface 42a of the coupling flange 42. The interior of the coupling flange 42 is provided with a first cylindrical member 42b formed substantially concentrically with the straight pipe region 40b of the bent pipe 40 and with a second cylindrical member 42c outward of the first cylindrical member 42b. The first cylindrical member 42b and second cylindrical member 42c are formed to sizes enabling insertion of the drain pipe 2 projecting from the floor 1. Specifically, the provision of the first cylindrical member 42b and second cylindrical member 42c makes it possible to accommodate two sizes of drain pipes.

The method of installing the drain socket of the tenth embodiment will be explained next. First, the drain pipe 2 projecting upward from the floor 1 is cut to a predetermined projection length. In this embodiment, the projection length of the drain pipe 2 from the floor 1 is 60 mm. Next, an adhesive is applied to the outer surface of the upper portion of the drain pipe 2 and the drain socket 30 of this embodiment is fitted onto the drain pipe 2 from above so as to insert the drain pipe 2 into the first cylindrical member 42b of the coupling flange 42. Once the drain pipe 2 has been pushed into the first cylindrical member 42b until the lower surface 42a of the coupling flange 42 makes contact with the floor 1, the orientation of the drain socket 30 is adjusted so as to face it in a predetermined direction. In this condition, the lower end of the bent pipe 40 is located about 20 mm below the floor 1. Since the lower end portion of the bent pipe 40 is formed with the straight pipe region 40b, the insertion of the bent pipe 40 into the drain pipe 2 projecting from the floor 1 can be achieved unhindered by collision of the bent pipe 40 with the drain pipe 2. Once the drain socket 30 has been oriented in the predetermined direction, the drain socket 30 is screwed to the floor 1 (screws not shown). Next, a packing (not shown) fit into the inlet 32 of the drain socket 30 and, as shown in FIG. 13, the flush toilet unit 5 is set on the floor 1 so that the outlet of the trap drainage channel 6 is received in the inlet 32. Water-tightness and air-tightness between the trap drainage channel 6 and the inlet 32 is established by the packing (not shown) disposed between the two. Finally, the direction of the flush toilet unit 5 is finely adjusted and the flush toilet unit 5 screwed to the floor 1 (screws not shown).

The effects of the drain socket of the tenth embodiment will be explained next. When no flushing water is being passed into the bowl of the flush toilet unit 5, the water level in the bowl is, as shown in FIG. 13, maintained at the height of the highest point of the trap drainage channel 6. When flushing water is passed into the bowl from this state, the flushing water rises above the highest point of the trap drainage channel 6 to flow through the outlet 7 of the trap drainage channel into the drain socket 30. As shown in FIG. 13, the outlet 7 of the trap drainage channel and the upstream end of the channel expansion section 34 are of substantially the same diameter, so that flushing water exiting the outlet 7 of the trap drainage channel flows smoothly into the channel expansion section 34. The water flowing into the channel expansion section 34 first passes mainly along the inner wall of the channel expansion section 34. The flushing water that flows along the inner wall of the channel expansion section 34 on the side in the direction opposite from the direction of eccentricity and passes between the deflector plates 38a, 38b, 38c to fall onto the siphon inducing shelf 36 and fly upward. The flushing water falling onto the siphon inducing shelf 36 at this time flies up in the radial direction of the channel expansion section 34 toward the center axis. In addition to this movement of the flushing water, the flushing water can also move in the circumferential direction of the channel expansion section 34 because the deflector plates 38a, 38b, 38c are formed apart from the siphon inducing shelf 36. The flushing water falling onto the siphon inducing shelf 36 in this manner spreads out in the channel expansion section 34 to form a water curtain covering a cross-section of the channel expansion section 34 with flushing water. Once the water curtain has been formed and the region of the channel expansion section 34 becomes filled with water, negative pressure is produced by the gravitational force acting on the pooled flushing water, i.e., a siphon effect is produced, whereby the flushing water, excrement, toilet paper and other waste in the bowl of the flush toilet unit 5 are drawn toward the drain socket 30. The waste passing into the channel expansion section 34 of the drain socket 30 together with the flushing water collides with the third edges of the deflector plates 38a, 38b, 38c to be redirected in the direction of eccentricity. In other words, the waste that collides with the deflector plates 38a, 38b, 38c moves downward along the third edges of the deflector plates 38a, 38b, 38c while passing into the bent pipe 40 to be discharged to the drain pipe 2. Since an extension of the third edge of the deflector plate 38b is directed tangential to the inner wall of the bent pipe 40 on the side in the direction opposite from the direction of eccentricity, the waste colliding with the deflector plates 38a, 38b, 38c passes smoothly into the bent pipe 40. Small pieces of waste entering the channel expansion section 34 pass between the deflector plates 38a, 38b, 38c or through the center region of the channel expansion section 34 into the bent pipe 40. The flushing water flowing into the channel expansion section 34 together with waste flows through the center region of the channel expansion section 34 and between the deflector plates 38a, 38b, 38c to pass through the bent pipe 40 and be discharged into the drain pipe 2. In this manner, the siphon effect is maintained for a predetermined time period, and when the flushing water and waste that was present in the bowl of the flush toilet unit 5 have been discharged into the drain pipe 2, the siphon effect terminates, flow of flushing water into the bowl of the flush toilet unit 5 stops, and flushing of the bowl is completed.

In the drain socket of the tenth embodiment of the present invention, large pieces of waste passing into the channel expansion section are guided by the deflector plates so that they can smoothly pass through despite the eccentricity of the drain socket. Moreover, since the deflector plates of the drain socket of this embodiment are formed to be spaced apart from the siphon inducing shelf, the flushing water colliding with the siphon inducing shelf can flow both radially and circumferentially so as to produce a siphon effect quickly at the initial stage of bowl flushing. In addition, since waste is guided to arrive at the bent pipe mainly by the deflector plates in the drain socket of this embodiment, the waste can be prevented from adhering to the siphon inducing shelf. Further, since the end portion of the bent pipe is constituted as a straight pipe in the drain socket of this embodiment, coupling with a drain pipe projecting a predetermined length from the floor is possible.

Figure 15:
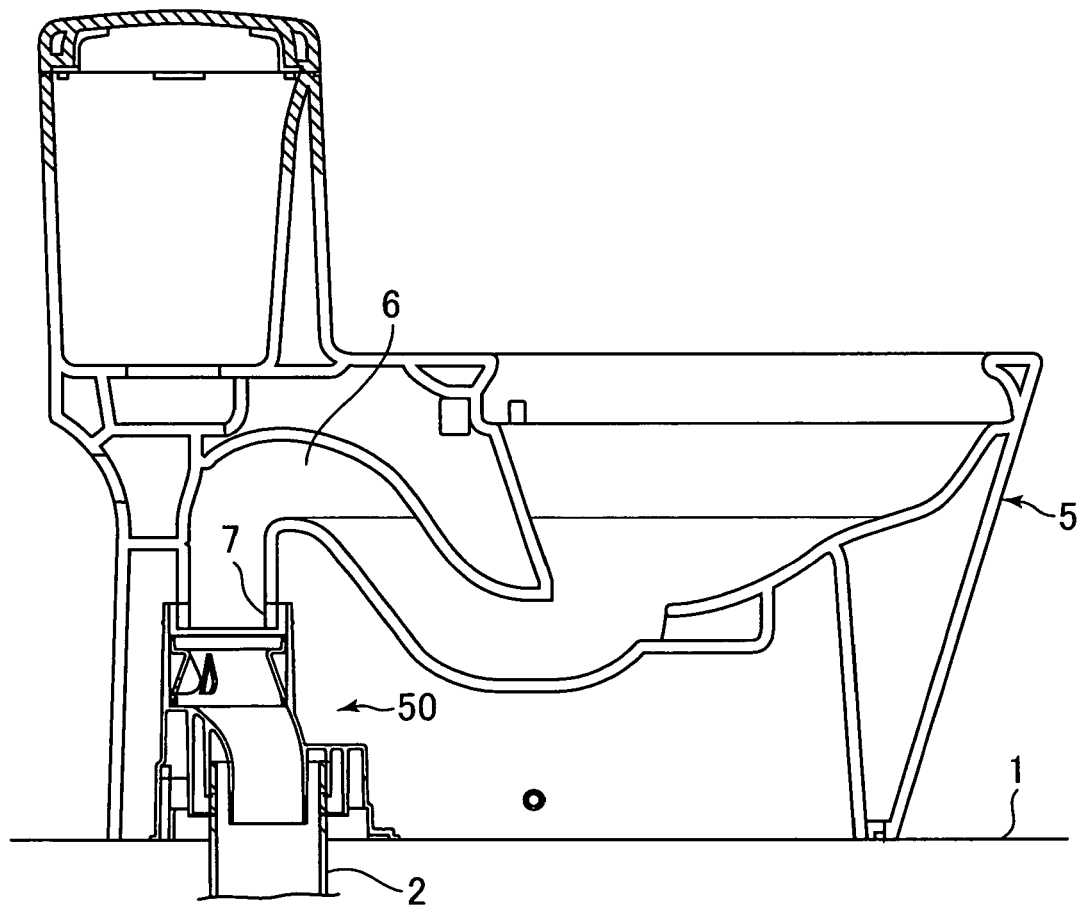
FIG. 15 is a sectional view showing a flush toilet unit to which a drain socket that is an eleventh embodiment of the present invention is attached.
Figure 16:
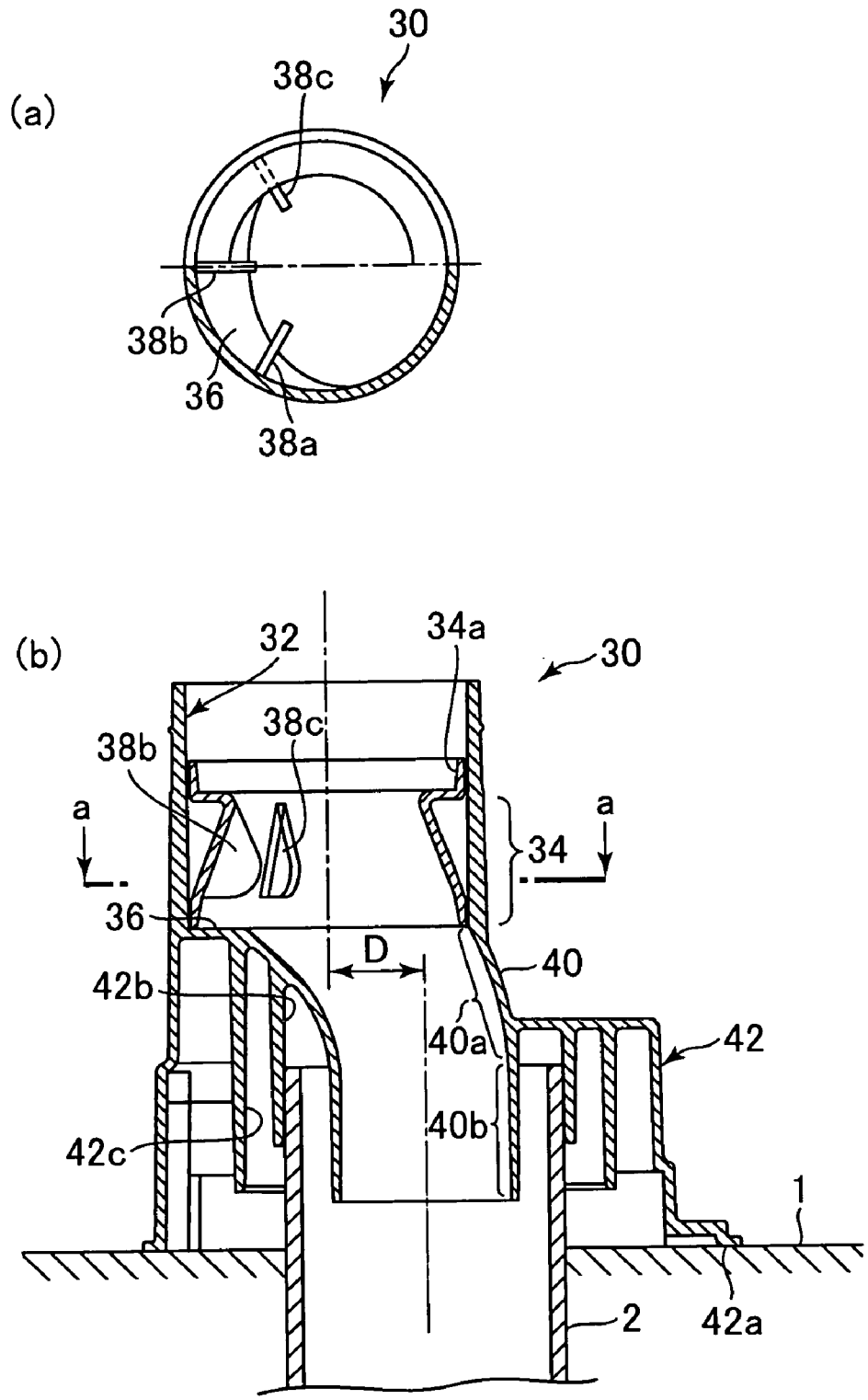
FIG. 16 is a set of diagrams showing the drain socket according to the eleventh embodiment of the present invention, wherein (a) is a cross-sectional view taken along a-a and (b) is a vertical sectional view.

An eleventh embodiment of the present invention will be explained next with reference to FIGS. 15 and 16. The drain socket of the eleventh embodiment of the present invention differs from the tenth embodiment in the point that outlet end of the bent pipe is located above the level of the floor. Therefore, only the points in which the eleventh embodiment of the present invention differs from the tenth embodiment will be explained here. FIG. 15 is a sectional view showing how a flush toilet unit is installed using the drain socket of the eleventh embodiment of the present invention. FIG. 16 is a set of sectional views of the drain socket of the eleventh embodiment of the present invention, wherein (a) is a half section viewed from the upper surface of the drain socket and (b) is a full section of the drain socket viewed from the front. The lower half of (a) in FIG. 14 is a section taken at a-a of (b).

As shown in FIG. 16, the drain socket 30 of the eleventh embodiment of the present invention has an inlet 32, an expansion section 34, a bent pipe 40, a siphon inducing shelf 36, deflector plates 38a, 38b, 38c, and a coupling flange 42. As shown at (b) of FIG. 16, in the present embodiment the straight pipe region 40b on the outlet side of the bent pipe 40 terminates at a higher level than the lower surface 42a of the coupling flange 42 so that the bent pipe 40 does not project downward beyond the coupling flange 42. In the present embodiment, length of the straight pipe region 40b is 50 mm and its end is located 10 mm above the floor.

The method of installing the drain socket of the eleventh embodiment will be explained next. The method of installing the drain socket of this embodiment is similar to the method of installing the drain socket of the tenth embodiment. As shown in FIG. 15, the drain socket 50 of this embodiment is fitted onto the drain pipe 2 from above, whereafter the flush toilet unit 5 is set on the floor 1 so that the outlet of the trap drainage channel 6 is received in the inlet 32 and the flush toilet unit 5 is screwed to the floor 1 (screws not shown). Water-tightness and air-tightness between the trap drainage channel 6 and the inlet 32 is established by a packing (not shown) disposed between the two.

The effects of the drain socket of the eleventh embodiment are also similar to those of the drain socket of the tenth embodiment. While generally speaking the force that produces negative pressure owing to the siphon effect tends to become weaker with shortening of a conduit of a drain socket outlet portion like the straight pipe region 40c of the bent pipe 40 of this embodiment, in the drain socket of this embodiment the required siphoning force can be adequately achieved.

Since the bent pipe 40 of the drain socket 50 of the eleventh embodiment of the present invention does not project below the coupling flange 42, it is possible during installation or transfer to a new location to mount the drain socket 50 so that the lower surface 42a of the coupling flange 42 thoroughly contacts the floor. The risk of damage to the bent pipe 40 of the drain socket 50 during transfer or the like can therefore be minimized. Moreover, the shortness of the bent pipe 40 enables improved formability of the bent pipe portion during manufacture of the drain socket 50 of this embodiment. As a result, distortion and other geometric errors of the formed bent pipe can be minimized and the bent pipe can be designed to have thin wall thickness.

Although preferred embodiments of the present invention were explained in the foregoing, the embodiments setout above can be variously modified.

INDUSTRIAL APPLICABILITY

The present invention provides a flush toilet and a drain socket that by aligning the direction of waste passing through a drainage trap enables simultaneous improvement of siphon effect induction and waste discharge performance.

In addition, the present invention provides a drain socket that can simultaneously achieve improved floating waste discharge performance by prolonging siphoning duration and improved large waste discharge performance by reduction of contact resistance.

Further the present invention provides a drain socket that can be utilized when a flush toilet unit and a drain pipe are not in alignment and that enables smooth passage of large pieces of waste so as to reduce the likelihood of waste adhering to interior portions.

The invention claimed is:

1. A drain socket for connecting an outlet of a trap drainage channel of a flush toilet unit and a drain pipe located external of the flush toilet unit, said drain socket comprising:
    a drain socket body provided with an inlet for coupling with the trap drainage channel and an outlet for coupling with the drain pipe;
    a siphon inducing region provided on an inner wall of the drain socket body for inducing a siphon effect; and
    a plurality of thin plate-like straightening vanes, each having a finite thickness, provided upstream of the siphon inducing region of the drain socket body to extend from the inner wall of the drain socket body in an inward direction of a channel of the drain socket body.

2. The drain socket according to claim 1, wherein the siphon inducing region includes a contraction step provided near an outlet portion of the outlet of the drain socket body.

3. The drain socket according to claim 1, wherein the siphon inducing region includes a channel contraction section provided in the drain socket body.

4. The drain socket according to claim 3, wherein said drain socket further comprises a channel expansion section in which an inside diameter of the drain socket body generally increases in a direction from the outlet towards the drain pipe, the channel expansion section being provided on an upstream side of the channel contraction section and the straightening vanes being provided in the channel expansion section.

5. The drain socket according to claim 4, wherein the straightening vanes are provided on an inner wall of the channel expansion section and the channel contraction section extends in the inward direction of the channel of the drain socket body.

6. The drain socket according to claim 1, wherein the number of straightening vanes is in the range of from 3 to 16.

7. The drain socket according to claim 1, wherein the length of each straightening vane from the inner wall of the drain socket body in the inward direction of the channel of the drain socket body is not less than 1 mm and not greater than (D1−D2)/2 mm, where D1 mm is the inside diameter of the drain socket body channel inner wall at the section where the straightening vanes are provided and D2 mm is the inside diameter of the outlet of the drain socket body.

8. The drain socket according to claim 1, wherein the thickness of each straightening vane is not less than 2 mm and not greater than 40 mm.

9. The drain socket according to claim 1, wherein the spacing between tips of the straightening vanes in the inward direction of the channel of the drain socket body is equal to or greater than 10 mm and equal to or less than 100 mm.

10. The drain socket according to claim 4, wherein a region of the drain socket body at a boundary between the channel expansion section and the channel contraction section is constituted as a divisible structure.

11. The drain socket according to claim 3, wherein the drain socket body is structured to establish the relationship L>D, where L is the length of the region between the channel contraction section and the outlet of the drain socket body and D is the inside diameter thereof.

12. The drain socket according to claim 1, wherein the drain socket body comprises a toilet socket module provided at the inlet of the drain socket body for accommodating the outlet of the trap drainage channel and a drain pipe socket module provided at the outlet of the drain socket body for insertion into the drain pipe.

13. The drain socket according to claim 3, wherein the drain socket body has a lateral pipe section extending laterally a predetermined distance between the channel contraction section and the outlet of the drain socket body.

14. A flush toilet comprising a drain socket according to claim 1 and a flush toilet unit in an integrated structure.

15. The drain socket according to claim 3, further comprising a guide groove provided on the downstream side of the channel contraction section continuously in a water flow direction; and the entire channel in the drain socket body having an inside diameter equal to or larger than the inside diameter of the outlet of the trap drainage channel.

16. The drain socket according to claim 15, wherein said drain socket further comprises a channel expansion section on an upstream side of the channel contraction section.

17. The drain socket according to claim 15, wherein the guide groove is formed by cutting away a part of the channel contraction section.

18. The drain socket according to claim 15, wherein said drain socket further comprises a straightening vane provided at the channel contraction section and at an inner wall upstream of the channel contraction section to extend in an inward direction of the channel of the drain socket body.

19. The drain socket according to claim 16, wherein said drain socket further comprises a straightening vane provided at the channel expansion section and the channel contraction section to extend in an inward direction of the channel of the drain socket body.

20. The drain socket according to claim 15, wherein the number of guide grooves is in the range of from 2 to 16.

21. The drain socket according to claim 15, wherein the depth of the guide groove is equal to or greater than 1 mm and equal to or less than 15 mm.

22. The drain socket according to claim 15, wherein the width of the guide groove is not less than 2 mm and not greater than 30 mm.

23. The drain socket according to claim 15, wherein guide grooves are provided with a spacing of guide groove tips in the inward direction of the channel of the drain socket body of equal to or greater than 5 mm and equal to or less than 100 mm.

24. The drain socket according to claim 15, wherein a region of the drain socket body at a boundary between the channel contraction section and the guide groove is constituted as a divisible structure.

25. The drain socket according to claim 15, wherein the drain socket body is structured to establish the relationship L>D, where L is the length of the region between the channel contraction section and an outlet provided with the guide groove and D is the inside diameter thereof.

26. A flush toilet comprising a drain socket according to claim 15 and a flush toilet unit.

27. A drain socket to be arranged to connect an outlet of a trap drainage channel of a flush toilet unit and a drain pipe located external of the flush toilet unit whose center is eccentrically located with respect to the center of the outlet of the trap drainage channel, said drain socket comprising:
an inlet for coupling with the outlet of the trap drainage channel;
a channel expansion section having an inside diameter expanding toward a downstream side from the inlet;
a plurality of thin deflector plates, each having a finite thickness and extending in an inward direction from an inner wall of the channel expansion section;
a siphon inducing shelf formed at a downstream end of the channel expansion section to extend at least on the side in the direction opposite from the direction of eccentricity; and
a pipe that extends from the downstream end of the channel expansion section having a downstream end eccentrically offset from the inlet for coupling with the drain pipe and a bent region coupling the downstream end of the pipe to the channel expansion section.

28. The drain socket according to claim 27, wherein the deflector plates are formed only on the inner wall of the channel expansion section on a side of the expansion section generally opposite from the direction that the pipe is offset.

29. The drain socket according to claim 27, wherein the deflector plates are formed to be spaced apart from the siphon inducing shelf.

30. The drain socket according to claim 27, wherein the deflector plates are of generally triangular shape, a first side of the triangular shape being joined to the inner wall of the channel expansion section, a second side being directed substantially horizontally, a third side being directed so that an extension thereof lies substantially tangent to an inner wall of the pipe on the side in the direction opposite from the direction of eccentricity, and an apex between the second side and the third side is rounded.

31. The drain socket according to claim 29, wherein a gap between the deflector plates and the siphon inducing shelf is between 5 and 15 mm.

32. The drain socket according to claim 28, wherein the siphon inducing shelf is formed to be widest at the middle and to narrow progressively in the direction of eccentricity.

33. The drain socket according to claim 27, wherein the deflector plates extend farther inward than the siphon inducing shelf.

34. The drain socket according to claim 27, wherein an end portion of the pipe adjacent the downstream end is constituted as a straight pipe.

35. The drain socket according to claim 27, wherein said drain socket further comprises a coupling flange for supporting the pipe on a floor on which the flush toilet unit is to be installed, the end of the pipe on the downstream end being above the floor when the coupling flange is set on the floor.

36. A flush toilet comprising a drain socket according to claim 27 and a flush toilet unit.

* * * * *